United States Patent
V V Ganeshan et al.

(10) Patent No.: US 12,001,951 B2
(45) Date of Patent: Jun. 4, 2024

(54) AUTOMATED CONTEXTUAL PROCESSING OF UNSTRUCTURED DATA

(71) Applicant: ACCENTURE GLOBAL SOLUTIONS LIMITED, Dublin (IE)

(72) Inventors: Kavita V V Ganeshan, Mumbai (IN); Swati Tata, Bangalore (IN); Soujanya Soni, Bangalore (IN); Madhur Bhasini Chaini, Bangalore (IN); Anjani Kumari, Jharkhand (IN); Omar Razi, Bangalore (IN); Thyagarajan Delli, Bangalore (IN); Ullas Balan Nambiar, Bangalore (IN); Guanglei Xiong, Pleasanton, CA (US); Sivasubramanian Arumugam Jalajam, Chennai (IN); Srinivasan Krishnan Rajagopalan, Chennai (IN); Venkatesan Kamalakannan, Chennai (IN); Harbhajan Singh, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 616 days.

(21) Appl. No.: 17/210,153

(22) Filed: Mar. 23, 2021

(65) Prior Publication Data

US 2022/0309332 A1 Sep. 29, 2022

(51) Int. Cl.
*G06N 3/08* (2023.01)
*G06F 16/35* (2019.01)
(Continued)

(52) U.S. Cl.
CPC ............. *G06N 3/08* (2013.01); *G06F 16/353* (2019.01); *G06F 18/22* (2023.01); *G06F 40/247* (2020.01);
(Continued)

(58) Field of Classification Search
None
See application file for complete search history.

(56) References Cited

U.S. PATENT DOCUMENTS 10,607,042 B1 * 3/2020 Dasgupta .............. G06F 40/253
2016/0171386 A1 6/2016 Brun et al.
(Continued)

OTHER PUBLICATIONS

Liu, Bulou, Chenliang Li, Wei Zhou, Feng Ji, Yu Duan, and Haiqing Chen. "An attention-based deep relevance model for few-shot document filtering." ACM Transactions on Information Systems (TOIS) 39, No. 1 (2020): 1-35. (Year: 2020).*

(Continued)

*Primary Examiner* — Frank D Mills
(74) *Attorney, Agent, or Firm* — Mannava & Kang, P.C.

(57) ABSTRACT

A system for providing automated and domain specific contextual processing for context based verification may classify a plurality of extracted parameters from a set of digitized training document to assign a document similarity score with respect to a set of reference documents. The system may automatically detect a domain for the set of digitized training documents based on the document similarity score. The system may load a domain based neural model for the detected domain to generate a plurality of pre-defined contextual parameters. The system may receive a set of input documents and perform a contextual processing of the received set of documents based on the pre-defined contextual parameters to obtain an output in form of a plurality of filtered snippets, each bearing a corresponding rank. The context based verification may be performed based on the plurality of filtered snippets and the corresponding rank.

18 Claims, 16 Drawing Sheets

(51) Int. Cl.
*G06F 18/22* (2023.01)
*G06F 40/247* (2020.01)
*G06N 3/04* (2023.01)
*G06V 30/18* (2022.01)
*G06V 30/262* (2022.01)
*G06V 30/40* (2022.01)

(52) U.S. Cl.
CPC ......... *G06N 3/04* (2013.01); *G06V 30/18057* (2022.01); *G06V 30/262* (2022.01); *G06V 30/40* (2022.01)

(56) References Cited

U.S. PATENT DOCUMENTS

| | | | |
|---|---|---|---|
| 2017/0169103 A1* | 6/2017 | Juneja | G06F 16/313 |
| 2017/0300565 A1 | 10/2017 | Calapodescu et al. | |
| 2021/0133224 A1* | 5/2021 | Tiwari | G06F 16/319 |
| 2022/0269864 A1* | 8/2022 | Xue | G06F 40/30 |

OTHER PUBLICATIONS

Alhadi, Arifah Che, Aziz Deraman, Masita Masila Abdul Jalil, Wan Nural Jawahir Wan Yussof, and Rosmayati Mohemad. "A computational analysis of short sentences based on ensemble similarity model." International Journal of Electrical and Computer Engineering (IJECE) 9, No. 6 (2019): 5386-5394. (Year: 2019).*

* cited by examiner

Extracted Snippet From Input Test Document
750

Document Level Context

| Loan # | TOE | TIFF ID | Field Name | Insurance Company | Field Value |
|---|---|---|---|---|---|
| 1111111 | Policy | 11111111 | | ABC Capital Insurance Co Property Address | 99999 Magnet Blvd, Los Angls, CA, 99999, Los Angls |

Field Level Context — 752

---

Matching Keywords: LOCATION, SCHEDULE, LOCATIONS, ADDRESS, LOS ANGELES, 99999, MAGNET, BLVD, 99999

1111 11 ABC ST, SANTA BARBARA, CA 1111 BUILDING 2: BUILDING CONTENTS LIMIT: $10,000 LOCATION 24 : 111 W ABC ST, ABC BUILDING 2: BUILDING CONTENTS LIMIT: $10,000 BARBARA, CA 77777 1111 POLICY NUMBER 1 XYZ 1 111111 SCHEDULE OF LOCATIONS LOCATION NUMBER LOCATION ADDRESS STATUS 4 1111 1111 NORTH LANE, LOS ANGELES, CA 88888 ACTIVE 5 99999 MAGNET BLVD, NORTH HOLLYWOOD, CA 99999 MODIFIED 6 11111 AC ST, ABC, CA 66666 ACTIVE 7 TOP ABC BLVD, ABC PARK, CA 1111

Example Result #1
710

704
702

---

Matching Keywords: LOCATION, LOS ANGELES, 99999, MAGNET, BLVD, 99999

ABC 000 COLUMBIA, MD 1111 1111 NAMED INSURED: A & B PROPERTIES, LLC PER BE17A BUSINESS OWNER DECLARATION PAGE POLICY#: 1 XYZ 1 111111 DECLARATION TYPE: POLICY CHANGE EFFECTIVE DATE: 05/23/2019 BLANKET SCHEDULE BLANKET#6 BUILDING COVERAGE TOTAL LIMIT $138,002,138
LOCATION 4 : 1111 1111 NORTH LANE, LOS ANGELES, CA 99999 BUILDING 2: BUILDING BUILDING LIMIT: $3,615,807 LOCATION 5 : 99999 MAGNET BLVD, NORTH BUILDING 2: BUILDING BUILDING LIMIT: $3,094,170 HOLLYWOOD, CA 99999
LOCATION

Example Result #2
720

---

Matching Keywords: DESIGNATION, PREMISES, 99999, MAGNET, BLVD, 99999

ADDITIONAL INSURED MORTGAGEE, ASSIGNEE, OR RECEIVER THIS ENDORSEMENT MODIFIES INSURANCE PROVIDED UNDER THE FOLLOWING:
BUSINESSOWNERS
POLICY SCHEDULE * NAME OF PERSON OR ORGANIZATION: FANNIE MAE ISAOA ATIMA C/O ABC MORTGAGE INVESTMENTS, LLC 00000 LAND PKWY LANE
000 COLUMBIA, MD 11111 0000 DESIGNATION OF PREMISES: 99999 MAGNET BLVD, HOLLYWOOD, CA 49999* INFORMATION REQUIRED TO COMPLETE THIS SCHEDULE, IF NOT SHOWN ON THIS ENDORSEMENT, WILL BE
SHOWN IN THE DECLARATIONS

Example Result #2
730

750

780

| DOCUMENT LEVEL CONTEXT | | | CRITICAL WORD DETECTION 790 | | |
|---|---|---|---|---|---|
| | | | | FIELD LEVEL CONTEXT | |
| LOAN # | TOE | TIFF ID | INSURANCE COMPANY | FIELD NAME | FIELD VALUE |
| 1111111 | POLICY | 11111111 | ABC CAPITAL INSURANCE CO | MORTGAGEE CLAUSE | FANNIE MAE ITS SUCCESSORS AND/OR ASSIGNS, AS THEIR INTEREST MAY APPEAR C/O SOME NAME1 MORTGAGE INVESTMENTS LLC |

MATCHING KEYWORDS 'MORTGAGEE', 'ASSIGNEE', 'INTERESTS', 'FANNIE', 'MAE', 'ITS', 'SUCCESSORS', 'ASSIGNS', 'MORTGAGE', 'LLC', 'WAY', 'FANNIE', 'MAE'

{A -- BUILDING REPLACEMENT COST $17,208,228 BLANKET 6 YEAR BUILT 1963 AUTOMATIC INCREASE -- BUILDING LIMIT 8% BUILDING ORDINANCE INCLUDED IN BUILDING LIMIT INCLUDED BUILDING GLASS INCLUDED LOCATION 20 FORMS: ABC000 06/89 BUILDING PROVISIONS ABC000 01/87 ADDITIONAL INSURED -- MORTGAGEE, ASSIGNEE, OR RECEIVER ABC000 01/87 ADDITIONAL INSURED -- CO-OWNER OF INSURED PREMISES LOCATION 20 ADDITIONAL INTERESTS: MORTGAGEE, ASSIGNEE OR FANNIE MAE ITS SUCCESSORS AND/OR ASSIGNS ATIMA, C/O SOMENAME2 COMMERCIAL MORTGAGE RECEIVER MORTGAGEE FANNIE MAE ITS SUCCESSORS AND/OR ASSIGNS ATIMA, C/O SOMENAME2 COMMERCIAL MORTGAGE LOAN NO: 1111111 LOSS PAYEE FANNIE MAE ITS SUCCESSORS AND/OR ASSIGNS ATIMA, C/O SOMENAME2 COMMERCIAL MORTGAGE CITY,ADDRESS, ZIPCODE LOAN NO: 1111111 CO-OWNER OF INSURED A&B, LP, 11111 SOME ST SOMEPREMISE ABC 000 HILLS, CA 99999 NAMED INSURED: A&B PROPERTIES, LLC -- PER BE17A BUSINESS OWNER DECLARATION PAGE}

USER INTERFACE 170

| LOAN #: | 1234567 | LEVEL: | DOCUMENT ▶ | DOCUMENT: ▶ | POLICY: ▶ | COVERAGE: ▶ |

| TEAM | REQUIREMENT | SEARCH RESULT | CURRENT / UPDATE |
|---|---|---|---|
| PROPERTY ADDRESS | 1111 SOME BLVD, LOS ANGELES, CA, 99999 | BUSINESS OWNER POLICY SCHEDULE * NAME OF PERSON OR ORGANIZATION: FANNIE MAE ISAOA ATIMA C/O SOME NAME ENTERPRISE MORTGAGE INVESTMENT, LLC 00000 SOME LAND PKWY ABC COLUMBIA, MD 99999 DESIGNATION OF PREMISES: 1111 SOME BLVD, OAKS, CA 99999 * INFORMATION | FEEDBACK TRACKING 802 |
| MATCH 2 | | BUSINESS OWNER POLICY SCHEDULE * NAME OF PERSON OR ORGANIZATION: SOMENAME BANK,N.A. AND ITS SUCCESSORS AND ASSIGNS C/O ATTN: SOME NUMBER COPPELL, TX DESIGNATION OF PREMISES : SOME PLACE BLVD, OAKS,CA  * INFORMATION REQUIRED TO COMPLETE THIS SCHEDULE, | |
| MATCH 3 | | DECLARATION TYPE; RENEWAL EFFECTIVE DATE: 05/20/220 LOCATION # 8: SOME BLVD, OKAS, CA LOCATION #8 TOTAL PREMIUM: $6,404 PACKAGE TYPE: APARTMENT THESE COVERAGE APPLY TO THIS LOCATION ONLY | |
| BORROWER NAME | A&B APARTMENTS | A&B GARDENS, LP, HILLS, CA NAMED INSURED A&B LLC.-PER BEI7A BUSINESS OWNER DECLARATION PAGE POLICY #: DECLARATION TYPE; RENEWAL EFFECTIVE DATE: 05/20/220 LOCATION # 21 :  PINS | |

DOCUMENT WINDOW

BUSINESS OWNER POLICY SCHEDULE* NAME OF PERSON OR ORGANIZATION: FANNIE MAE ISAOA ATIMA C/O SOMENAME ENTERPRISE MORTGAGE INVESTMENTS, LLC 000 SOME LAND {KY COLUMBIA, MD 99999 DESIGNATION OF PREMISES: 1111 SOME BLVD, SOME OAKS, CA 99999 * INFORMATION

AUTOMATED CONTEXTUAL PROCESSING OF UNSTRUCTURED DATA

BACKGROUND

Businesses across the globe that involve document-based substantiation such as insurance companies, legal firms and the like, tend to rely on manual verification of information. Such information may be received in the form of unstructured data such as non-digital documents or images. Examples of such operations may include finding similar legal cases for a given document, checking image compliance against policy documents, checking profile validity against policy document compliance and the like.

Manually performed verification may be tedious and time-consuming, thus increasing labor costs and also incurring overhead expenses to such businesses. Further, the effectiveness or accuracy of physically-read documents may depend on the ability and professional experience of the reviewer, which may vary on an individual basis, thereby leading to inconsistency of verification performance. For example, services offering loan borrowing schemes or property insurance schemes may involve stringent guidelines for verification that may demand high reliability in checking huge volume of unstructured data. In such cases, manual verification may not be sufficient. Conventional automated solutions may also not be reliable as they tend to be more generalized in nature that may lead to erroneous prediction or verification. One term may include different meanings based on the domain of service. For example, an abbreviation of a term such as "dr" may relate to "drive" in a vehicle insurance domain, but the same term may mean "doctor" in a medical insurance business. Conventionally available techniques may not be effective in terms of domain specificity.

SUMMARY

An embodiment of the present disclosure includes a system for automated contextual processing for context based verification including a processor and a data trainer. The processor may include a contextual processing engine and a learning engine. The data trainer may classify, using a classification model, a plurality of extracted parameters from a set of digitized training documents. The classification may be performed to assign a document similarity score with respect to a set of reference documents corresponding to a plurality of domains. The data trainer may automatically detect a domain for the set of digitized training documents based on the document similarity score. The data trainer may load a domain based neural model for the detected domain to generate a plurality of pre-defined contextual parameters specific to the detected domain. The plurality of pre-defined contextual parameters may be obtained by extraction of multiple queries from the set of digitized training documents and subsequent processing of the extracted queries. The contextual processing engine may receive a set of input documents obtained by digitization of non-digital documents bearing unstructured data. The contextual search engine may perform a contextual processing of the received set of input documents using an artificial intelligence (AI) model. The contextual processing may be performed based on the pre-defined contextual parameters to obtain an output. The output may be in the form of a plurality of filtered snippets, each bearing a corresponding rank. The contextual processing may include context building, context search and context based ranking of one or more snippets extracted from the input documents. The context based verification of the unstructured data may be performed based on the plurality of filtered snippets and the corresponding rank. The system may also include a hybrid ensemble, a tag generator and a user interface.

Another embodiment of the present disclosure may include a method for automated contextual processing for context based verification. The method may include classifying, by a processor, using a classification model, a plurality of extracted parameters from a set of digitized training documents, wherein the classification may be performed to assign a document similarity score with respect to a set of reference documents corresponding to a plurality of domains. The method may include detecting automatically, by the processor, a domain for the set of digitized training documents based on the document similarity score. The method may include loading, by the processor, a domain based neural model for the detected domain to generate a plurality of pre-defined contextual parameters specific to the detected domain, wherein the plurality of pre-defined contextual parameters may be obtained by extraction of multiple queries from the set of digitized training documents and subsequent processing of the extracted queries. The method may include receiving, by the processor, a set of input documents obtained by digitization of non-digital documents bearing unstructured data. The method may include performing, by the processor, using an AI model, a contextual processing of the received set of input documents based on the pre-defined contextual parameters to obtain an output in form of a plurality of filtered snippets, each bearing a corresponding rank. The contextual processing may include context building, context search and context based ranking of one or more snippets extracted from the input documents. The context based verification of the unstructured data may be performed based on the plurality of filtered snippets and the corresponding rank.

Yet another embodiment of the present disclosure may include a non-transitory computer readable medium comprising machine executable instructions that may be executable by a processor to classify a plurality of extracted parameters from a set of digitized training documents. The classification may be performed to assign a document similarity score with respect to a set of reference documents corresponding to a plurality of domains. A domain may be automatically detected for the set of digitized training documents based on the document similarity score. A domain based neural model may be loaded for the detected domain to generate a plurality of pre-defined contextual parameters specific to the detected domain. The plurality of pre-defined contextual parameters may be obtained by extraction of multiple queries from the set of digitized training documents. A set of input documents may be received. The input documents may be obtained by digitization of non-digital input documents bearing unstructured data. A contextual processing may be performed on the received set of input documents based on the pre-defined contextual parameters to obtain an output. The output may be in form of a plurality of filtered snippets, each bearing a corresponding rank. The contextual processing may include context building, context search and context based ranking of one or more snippets extracted from the input documents. The context based verification of the unstructured data may be performed based on the plurality of filtered snippets and the corresponding rank.

BRIEF DESCRIPTION OF DRAWINGS

FIG. 7A illustrates an example pertaining to context building, according to an example embodiment of the present disclosure.

FIG. 7B illustrates an example pertaining to critical word detection in context building, according to an example embodiment of the present disclosure.

FIG. 8B illustrates plurality of filtered snippets obtained at a user interface, according to an example embodiment of the present disclosure.

DETAILED DESCRIPTION

Figure 1:
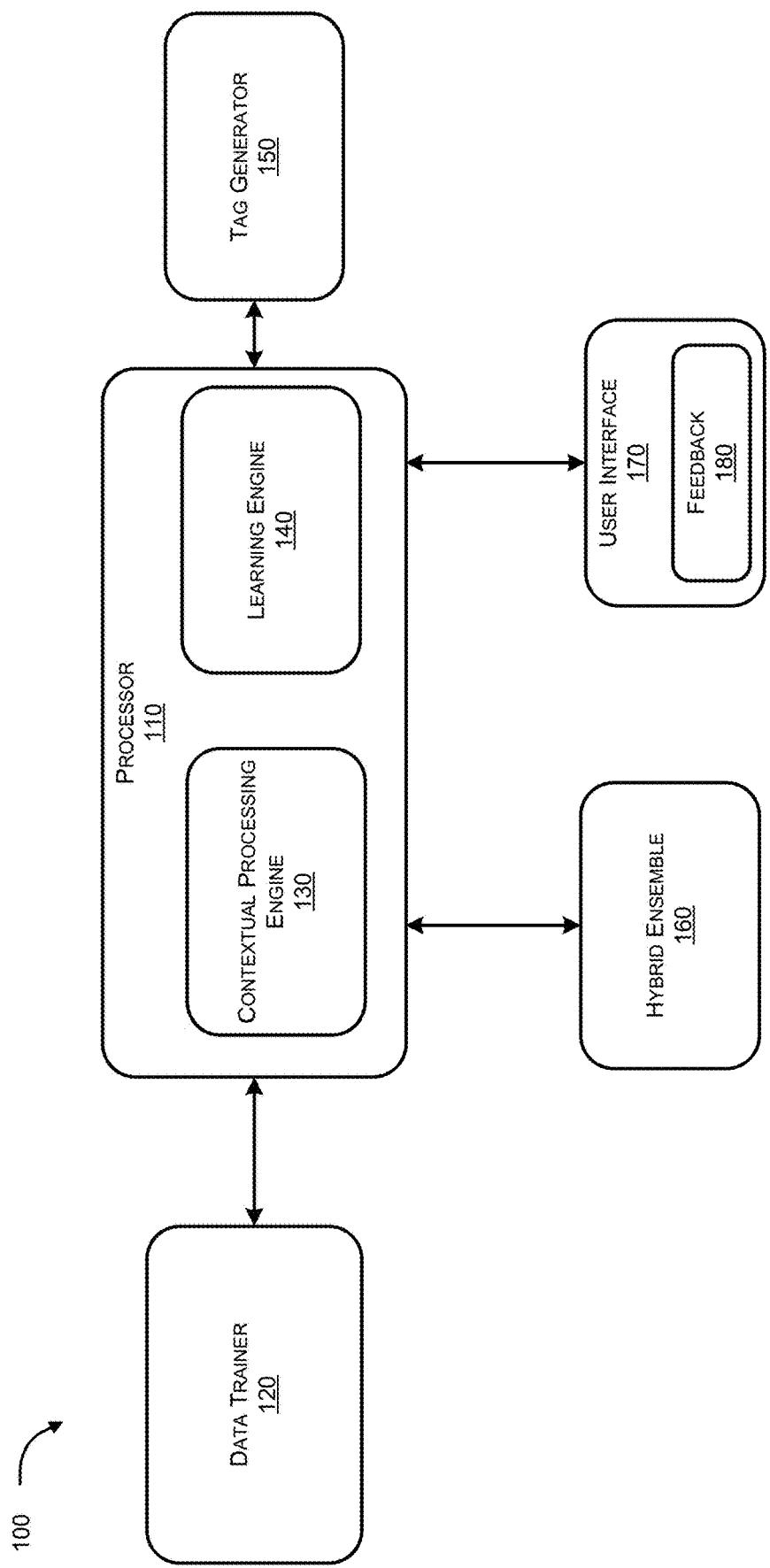
FIG. 1 illustrates a system for automated contextual processing of unstructured data for a context based verification, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe providing a solution for automated contextual processing for context based verification. The embodiments describe a solution, particularly for contextual extraction and processing of unstructured data for verification of non-digital documents bearing the unstructured data. The contextual processing may be domain-specific. The solution may include a training phase for training the system, a serving phase for performing the context based verification, and a learning phase for improving performance of system based on feedback.

An example embodiment of the present disclosure pertains to a system for automated contextual processing of an unstructured data. The proposed system may include a processor and a data trainer. The processor may include a contextual processing engine and a learning engine. The data trainer may generate a plurality of pre-defined contextual parameters specific to a detected domain by using a domain based neural model. The domain based neural model may be detected by classification of a plurality of extracted parameters from a set of digitized training documents to assign a document similarity score with respect to a set of reference documents. Based on the document similarity score, the domain is detected and the domain based neural model is loaded.

In an example embodiment, the contextual processing engine of the processor receives a set of input documents. The input documents correspond to a digitized version of non-digital documents bearing unstructured data that is required to be verified. The contextual processing engine may perform a contextual processing of the received input documents by using an AI model. The contextual processing is performed based on the pre-defined contextual parameters received from the data trainer, wherein the processing may include context building, context search and context based ranking of multiple snippets extracted from the input document. The output of the contextual processing is in the form of plurality of filtered snippets, each bearing a corresponding rank. Using the output, the context based verification of the unstructured data may be performed. In an example embodiment, the context based verification may be performed manually at the user interface. The manual verification may be performed by a user by checking the plurality of filtered snippets generated by the contextual processing engine. The user may manually check the correctness of the plurality of filtered snippets (topmost snippets) and provide a corresponding feedback that may be sent to the learning engine for further processing. In another example embodiment, the context based verification may be performed automatically by the system. The automated verification may be performed by using a trained model. The system may store a collective dataset including the manual feedback that may be received at the user interface along with the plurality of filtered snippets for which the manual feedback is received. The model may be trained by feeding the collective dataset in a training phase. The trained model so obtained may be used for automated context based verification of the unstructured data.

In an example embodiment, the processor may also include a learning engine that updates the plurality of filtered snippets of the output by performing a context based detection and context based update. The update may be performed based on a feedback that may include at least one of a preference indication and data correction of the plurality of filtered snippets. In an embodiment, the feedback may be manually provided by a user through the user interface. In an example embodiment, the feedback may be provided upon manual verification based on the automatically generated plurality of snippets.

The proposed system may also include a hybrid ensemble that may receive input from the contextual processing engine and the learning engine to process the received inputs and update the rank corresponding to the plurality of filtered snippets. The proposed system may also include a tag generator to generate an annotation in an image document corresponding to the input documents to indicate contextual co-ordinates.

Exemplary embodiments of the present disclosure have been described in the framework of automated contextual processing for context based verification of unstructured data in non-digital documents especially in view of insurance companies. Such companies require to perform verification of information in non-digital documents for checking compliance and other such purposes. However, the present disclosure may not be limited to such companies and may be useful for other corporations handling their legal, financial and human resources based data verification. For example, in data verification of non-digital documents such as, for example, the legal field, that may require the study and extraction of information relevant to legal case details provided in non-digital or unstructured format. Other examples may include processing of loan related applications in financial corporations. One of ordinary skill in the art will appreciate that embodiments and concepts described herein may be applied in various other scenarios.

FIG. 1 illustrates a system 100 for automated contextual processing for context-based verification, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 110, a data trainer 120, a hybrid ensemble 160, a tag generator 150 and a user interface 170. The processor 110 may include a contextual processing engine 130 and a learning engine 140.

The data trainer 120 performs automated detection of a domain for a set of training documents. Based on the detected domain, a relevant domain model may be loaded for extraction of contextual parameters relevant to the detected domain. The data trainer 120 generates the contextual parameters as a part of training phase to provide enriched vocabularies or queries for a specific domain. The enriched queries are used during a serving phase by the contextual processing engine 130 of the processor 110. The system 100 may be a hardware device including the processor 110 executing machine readable program instructions to perform contextual processing of input documents through the contextual processing engine 130 using the contextual parameters as provided by the data trainer 120. The processor 110 may also learn and update the processed data through the learning engine 140, based on a feedback 180 received from the user interface 170. Execution of the machine readable program instructions by the processor may further enable the proposed system to configure the hybrid ensemble 160 to improve or update the processed output from the processor 110. Tag generator 150 may generate an annotation to improve automated assignment of co-ordinates for improved update or reference.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 110 may include, for example, microprocessors, microcomputers, microcontrollers, digital signal processors, central processing units, state machines, logic circuits, and/or any devices that manipulate data or signals based on operational instructions. Among other capabilities, processor 110 may fetch and execute computer-readable instructions in a memory operationally coupled with system 100 for performing tasks such as data tagging, data processing input/output processing, feature extraction, and/or any other functions. Any reference to a task in the present disclosure may refer to an operation being or that may be performed on data.

In an example embodiment, the data trainer 120 and the processor 110 may be associated with a central or public repository. The data trainer may be able to access any of large volume of reference documents, public data sources and/or available vocabulary corresponding to a plurality of domains. The stored reference documents may be consumed by available intelligent units of the proposed system 100 for further processing. Further, repository may be updated regularly by adding more reference documents, vocabulary or models for a given domain. The data trainer 120 and the processor 110 may also include access to multiple models that may be domain-specific.

Figure 2:
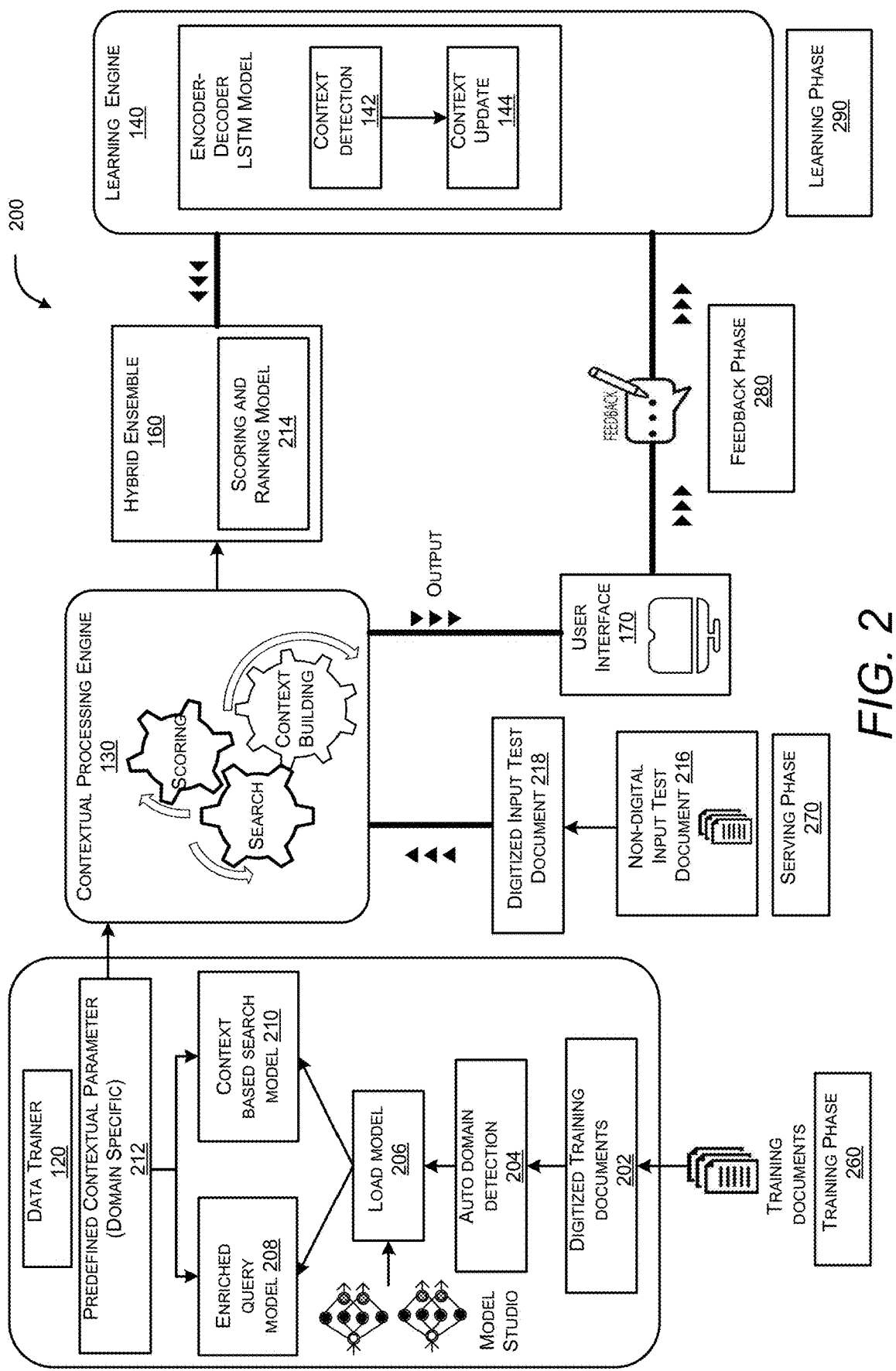
FIG. 2 illustrates an overview of the components of the system of FIG. 1, according to an example embodiment of the present disclosure.

FIG. 2 illustrates an overview 200 of the components of the system 100 illustrated in FIG. 1, according to an example embodiment of the present disclosure. The system 100 may be associated with a training phase 260, a serving phase 270, a feedback phase 280 and a learning phase 290. In the training phase 260, data trainer 120 may receive a set of digitized training documents 202. The digitized training documents 202 are obtained by converting non-digital training documents to a digitized and readable format. Data trainer 120 may automatically detect a domain (204) for the digitized training documents 202 based on a document similarity score. For determining the document similarity score, a classification may be performed by the data trainer 120. The document similarity score may enable to understand contextual relevance of any training document with a domain. Based on the contextual relevance, an appropriate domain model 206 may be loaded. Using the loaded model 206, pre-defined contextual parameters 212 are generated. This may be performed by context based enriching/searching queries from training documents. The contextual parameters 212, generated in the training phase of the system 100 is used as a contextual database in the serving phase for processing the actual input documents.

In serving phase 270, the system 100 receives non-digital input documents 216 bearing unstructured data for automated contextual processing. The input documents 216 are converted to a digitized and searchable format 218, prior to subjecting the input test documents 216 to contextual processing. The contextual processing may include context building, context search and context based ranking of one or more snippets extracted from the input documents to obtain an output. The output may be in the form of a plurality of filtered snippets, each bearing a corresponding rank. The term "snippet" may correspond to a snapshot or collection of words extracted from input documents based on preferential keywords relevant to a domain. Based on the output from contextual processing, the context based verification is carried out by the processor 110.

In the feedback phase 280, a user interface 170 of the system 100, may receive the output from the contextual processing engine 130. The user interface 170 may be used for providing a feedback for the learning phase 290. The feedback may include at least one of a preference indication and a data correction of the plurality of filtered snippets.

In the learning phase 290, the learning engine 140 of the processor 110, may update the plurality of filtered snippets using a neural network based model. The update may be performed by a context based detection 142 and context based update 144, based on the feedback from the user interface 170. In an example embodiment, the network based model may be an encoder decoder based long short term memory (LSTM) model.

Hybrid ensemble 160 may receive inputs from the learning engine 140 and the contextual processing engine 130, wherein by using both these inputs, the hybrid ensemble 160 may update the rank of the plurality of snippets using a scoring and ranking model 214.

Figure 3:
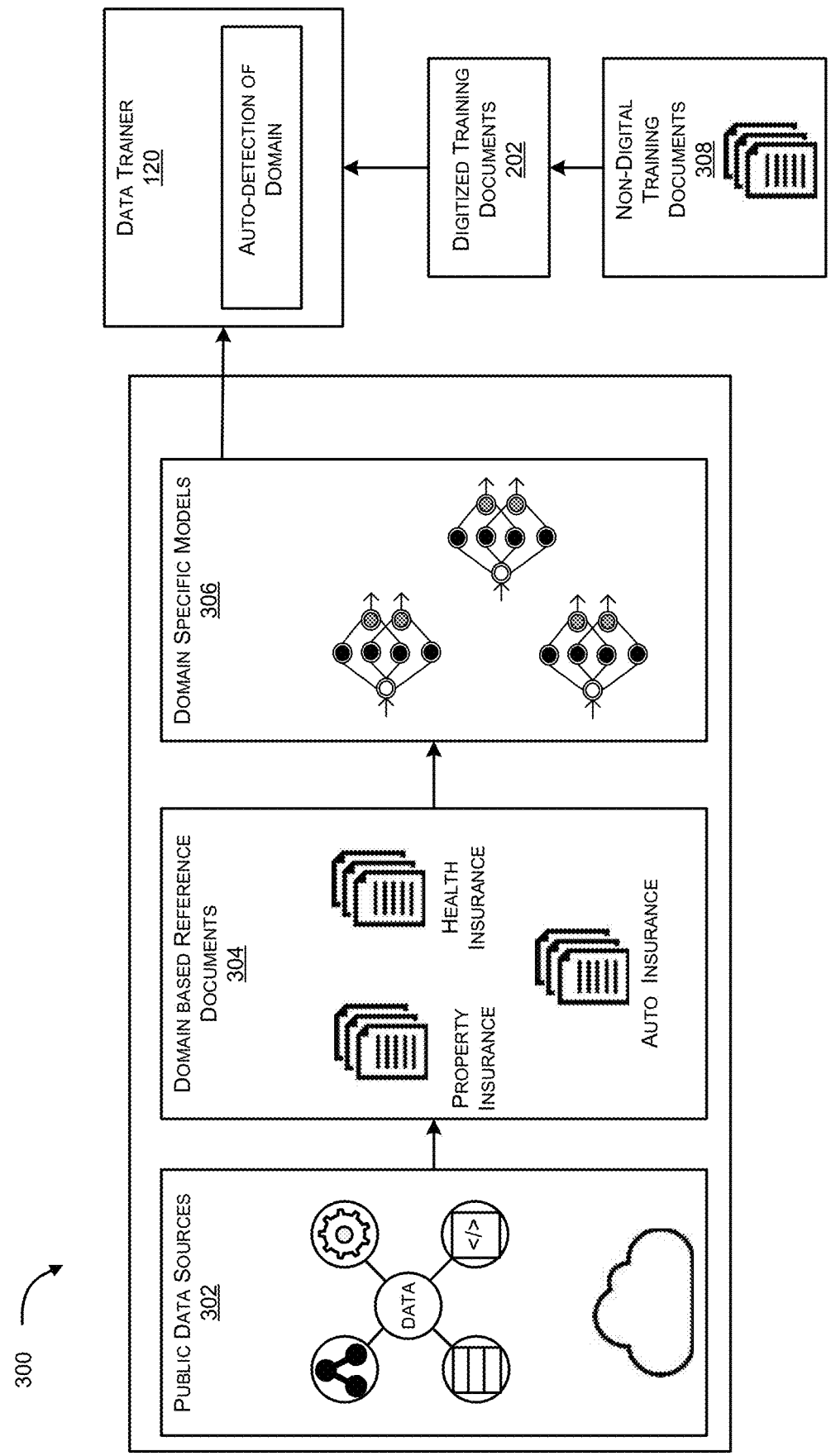
FIG. 3 illustrates a flow diagram for automatic detection of a domain by data trainer of FIG. 1, according to an example embodiment of the present disclosure.

FIG. 3. illustrates an overview 300 of the automatic detection of a domain by the data trainer 120, according to an example embodiment of the present disclosure. Domain detection requires extracting parameters from the training documents and further classification of the extracted parameters to determine the domain type. Referring to the training phase performed using the data trainer 120, the classification is performed by a classification model. The classification model may compare extracted parameters of the training document with corresponding parameters of reference documents 304 belonging to a plurality of domains. The classification is performed to assign the document similarity score. The document similarity score may enable to understand contextual relevance of any training document with a domain, such that based on this similarity, an appropriate domain model 206 may be loaded. Domain model may be loaded from available models 306 in the repository or any database associated with the data trainer 120.

In an example embodiment, the training documents may correspond to domain based reference documents that may include property insurance, health insurance, auto insurance, general insurance, but may not be limited to such domains. It may further include legal, health, financial and other such domains that may require context based verification of large volumes of unstructured data in non-digital format. Prior to usage, the training documents are digitized and converted into a readable format from the non-digital documents 308. Each training document may belong to a domain and may include certain vocabulary based parameters such as keywords, terms, usage of abbreviations, and the like, that are specific to the domain. During classification by the data trainer 120, one or more of these parameters may be extracted and compared with the reference documents 304. In an example embodiment, the classification may include few-shot text classification. The classification model may include at least one of an attention-based induction network model and a Siamese based network model. In another example embodiment, the document similarity score may be generated by a natural language processing (NLP) tool. The NLP tool may include, for example, Doc2vec, Bidirectional Encoder Representations from Transformers (BERT™), and other NLP based tools. The reference documents 304 may be retrieved from public sources 302 or any database/repository associated with the data trainer 120. For loading the domain model, the database may be searched or looked up by using a set of key words that may be specific to the domain.

Referring back to FIG. 2, in the training phase 260, once the domain is detected and the relevant domain model is loaded, multiple pre-defined contextual parameters 212 is generated for the detected domain. The contextual parameters 212 correspond to an enriched vocabulary generated for multiple domains that may be used as a reference point in serving phase of the system 100. The contextual parameters 212 specific to the detected domain is generated by the data trainer 120 by extracting multiple queries from the digitized training documents and subsequent processing of the extracted queries. The contextual parameters 212 may be obtained by using at least one of an enriched query model 208 and a context based search model 210. Enriched query model 208 may be used for cleaning and enriching the extracted queries to improve the contextual nature of the determined parameters 212.

Figure 4:
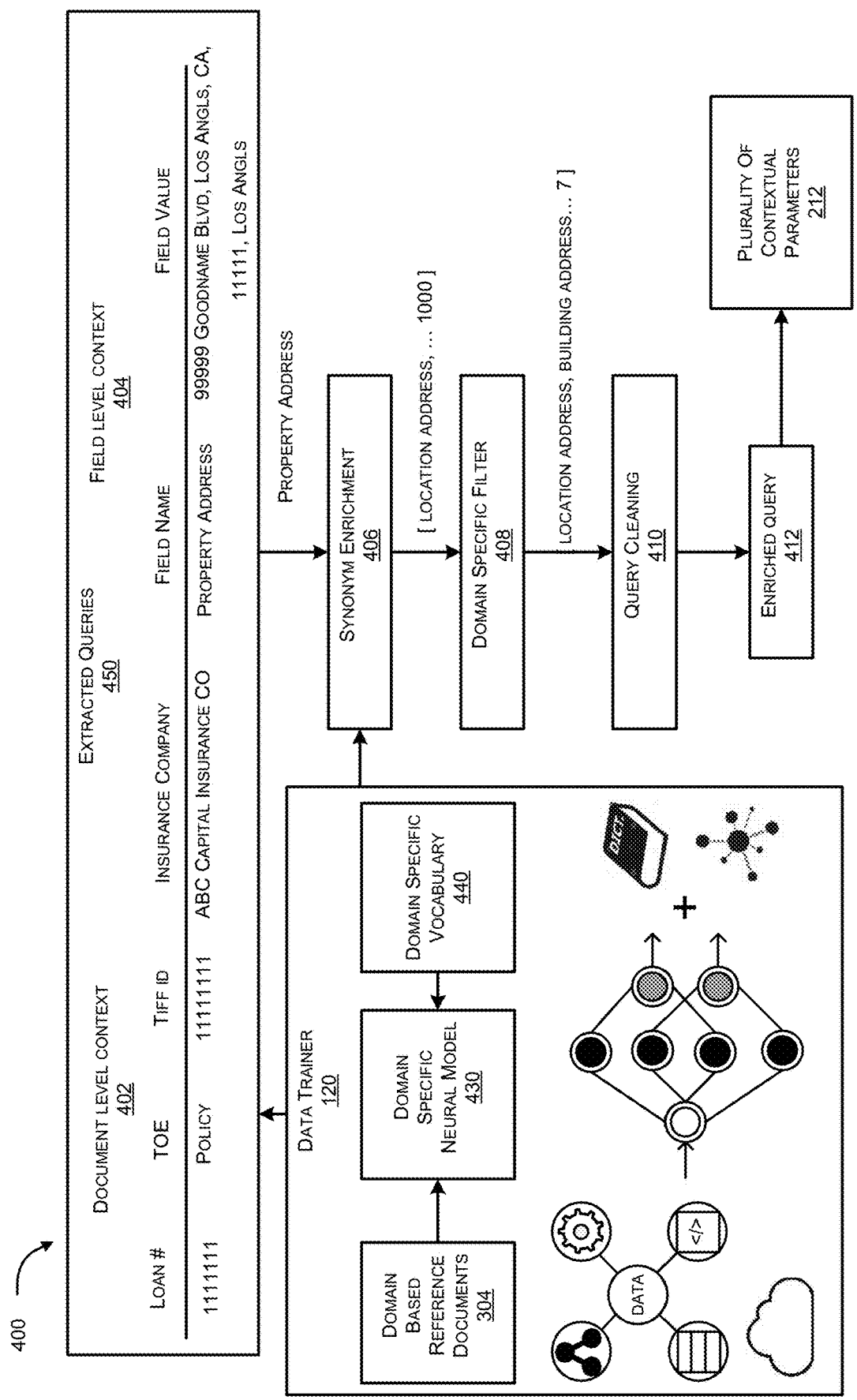
FIG. 4 illustrates a flow diagram for obtaining a plurality of contextual parameters by the data trainer of FIG. 1, according to an example embodiment of the present disclosure.

In this regard, FIG. 4 illustrates a flow diagram 400 for obtaining a plurality of contextual parameters 212 through the data trainer 120 of FIG. 1, according to an example embodiment of the present disclosure. As illustrated in FIG. 4, the pre-defined contextual parameters 212 may be generated by loaded domain based neural model 430 that was loaded after automatic detection of domain. In an example embodiment, the model 430 may be used in combination with a first predefined vocabulary 440 specific to the detected domain. In another example embodiment, domain based reference documents 304 may also be used for improving the vocabulary of the data trainer 120. The data trainer may extract queries from training documents and further enrich them using the loaded model 430 and/or vocabulary 440 to obtain enriched query 412. The enrichment may involve processing of the extracted queries by at least one of synonym enrichment 406, domain based filtering 408, and query cleaning 410.

In an example embodiment and in reference to FIG. 4, a query 450 may extracted by the data trainer 120. The extracted query 450 may include a document level context 402 and a field level context 404, but may also include other levels of context relevant to a domain. The document level context 402 may include specific details of a document, such as a number (such as loan number), type of document (such as policy), identity attributes (ID number), entity details (such as insurance company) and the like. The field level context 404 may include field level details such as field name (property address) and field value (address details). The mentioned details are only exemplary and several other such attributes may be extracted by the data trainer 120.

The extracted query 450 may be enriched by performing enrichment procedure on any of the context levels (402, 404). The synonym enrichment 406 is performed for obtaining specific set of synonyms. For example, the system may retrieve synonyms such as "location address" for a term/query such as "property address". Based on synonym building, for each attribute of extracted queries, multiple results may be derived (such as 1000 results at 406). In an example embodiment, the synonym enrichment may be performed by using word2vec that may include low threshold to have generic match. The term "word2vec" refers to a natural language processing technique that uses word2vec algorithm. The word2vec associates each distinct word with a specific list of numbers or vectors. The word2vec includes a neural network model to evaluate association between words from a huge corpus of text for training the model. The trained neural network model of word2vec may be able detect or suggest synonymous for a set of words or sentence. Further, the results from synonym enrichment are further subjected to domain specific filter 408. Based on the nature of the domain, the results from the synonym enrichment 406 may be filtered. For example, the results obtained after applying filter 408 may include a pre-defined format as per the domain requirements (such as "Location address, building address, . . . "). In an example embodiment, the domain specific filter may be applied by using word2vec that may include high threshold to provide specific match. The results from the domain filter 408 may be subjected to query cleaning for removal of undesired attributes or formatting to obtain the enriched query 412. In an example embodiment, the query cleaning may be performed to reformulate the original query or to replace the original query with an expanded query with improved context. The enriched query may be further processed to obtain the contextual parameters 212.

Figure 5:
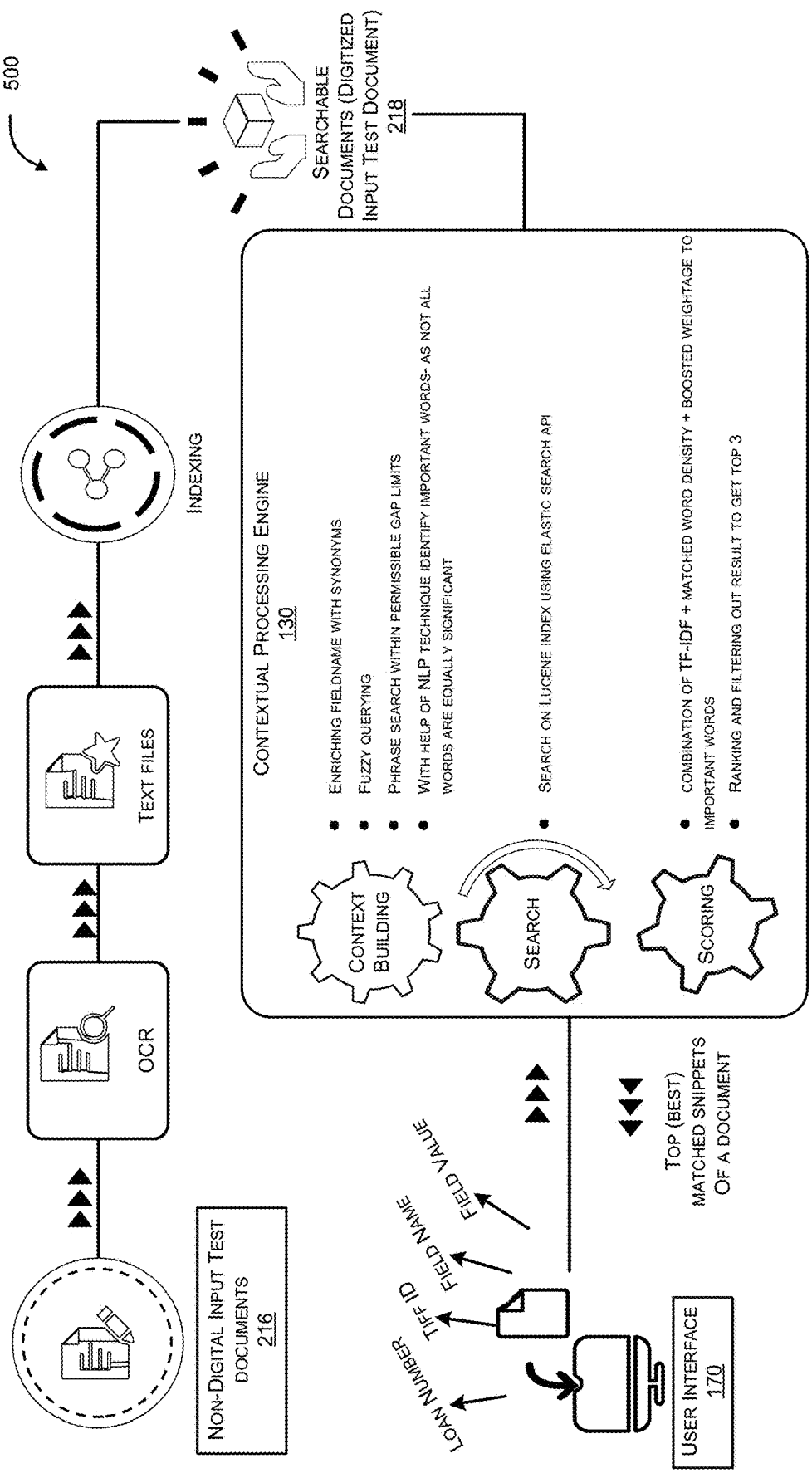
FIG. 5 illustrates an overview of contextual processing by contextual processing engine of FIG. 1, according to an example embodiment of the present disclosure.

Referring back to FIG. 2, in the serving phase 270, the contextual parameters 212 generated in the training phase are used for contextual processing of input documents by the contextual processing engine 130. In this regard, FIG. 5 illustrates overview of contextual processing by contextual processing engine 130 of FIG. 1, according to an example embodiment of the present disclosure. Input documents 216 may be in non-digital format that may be converted into digital and readable/searchable form 218 by known techniques such as optical text recognition (OCR), indexing and the like. Digitized input text documents so obtained may be subjected to contextual processing at engine 130. The contextual processing includes processing of extracted snippets from input document. The processing includes context building, context search and context scoring/ranking to obtain the plurality of filtered snippets, each bearing a corresponding rank. As shown in FIG. 5, the step of context building may include at least one of enrichment of fieldname with synonyms, fuzzy querying, phrase search within permissible gap limits and identifying important words by NLP tool. The other key steps in context building may include at least one of spelling error detection, abbreviation expansion, alias detection, context window detection, critical word detection, key entity detection, and similar such techniques that are discussed in detail in the following figures. The second step of context search may be performed by elastic search. The final step of context scoring is performed by assigning a score. This may be done by at least one of term frequency-inverse document frequency (TF-IDF), matched words density, boosted weightage assignment to important words. The filtered snippets are obtained as output, which is sent to the user interface 170.

Figure 6A:
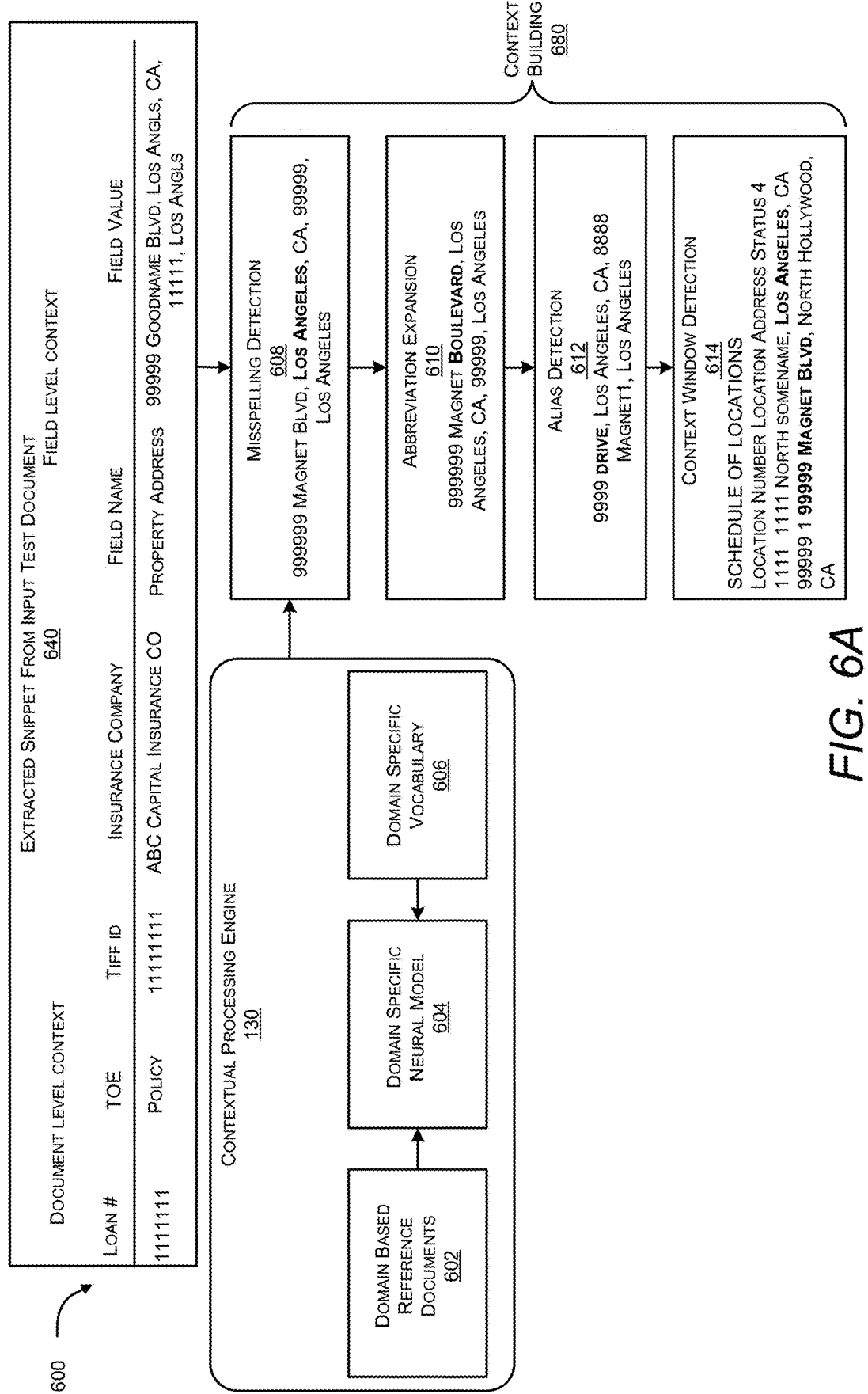
FIG. 6A illustrates a flow diagram for context building performed by contextual processing engine of FIG. 1, according to an example embodiment of the present disclosure.
Figure 6B:
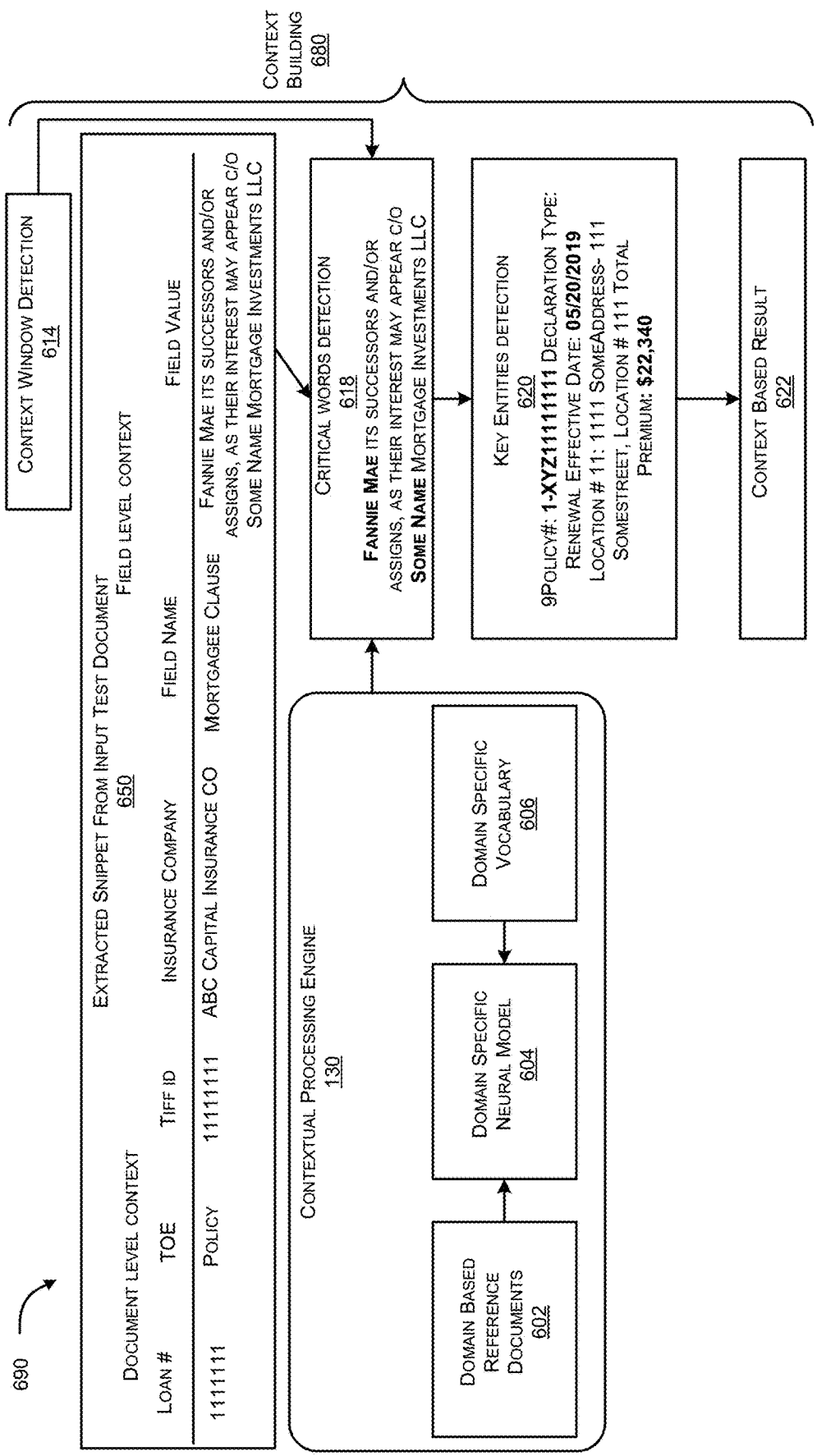
FIG. 6B illustrates a flow diagram for context building performed by contextual processing engine in addition to the illustration in FIG. 6A, according to an example embodiment of the present disclosure.

FIGS. 6A and 6B illustrate flow diagrams 600 and 690 respectively, for context building performed by contextual processing engine 130 of FIG. 1, according to an example embodiment of the present disclosure. As shown in FIG. 6A, one or more snippets 640 are extracted from digitized input documents. The extracted snippets may include different context levels (such as document context level, field context level). The contextual processing may be performed by engine 130 using a domain specific neural model 604. In an embodiment, the model 604 may be the AI model. The term "artificial intelligence" may relate to machines such as computers that can mimic a cognitive function similar to learning or problem-solving abilities displayed by humans. The AI model may include an artificial neural network including neurons. The neural network of the AI model may include three basic layers such as an input layer, a hidden layer and an output layer. The hidden layer may be between input and output layers. The neurons of the neural network may receive a set of weighted inputs and produce an output through an activation function. During a training stage of AI model, a huge volume of input data may be fed to the input layer of the neural network, and an estimated output may be checked for loss/error value. The contextual processing ability of the AI model to generate plurality of filtered snippets may keep getting more accurate with more volume of data fed to the input layer during the training stage. In an example embodiment, the input layer may be fed multiple input information. Input information may include at least one of domain related queries, keywords and/or contextual parameters derived in the training phase. In an example embodiment, the input information may include at least one of field name and a field value corresponding to, for example, an entity, a property, and other such information. For example, the field name may be property address and the field value may be value of the property address. Various other such input information may be fed at the training stage. Once trained, in the testing stage, the AI model may automatically perform contextual processing on the input documents.

In an example embodiment, the auto-detection of domain performed in the training phase may be useful in choosing corresponding models for the contextual processing. In an example embodiment, the model 604 may be used in combination with a second predefined vocabulary 606 specific to the detected domain. In another example embodiment, domain based reference documents 602 may also be used for improving the context of the contextual processing engine. In an example embodiment, the context building may include synonym enrichment by using public data sources. The synonym enrichment may include use of use of dictionaries such as, for example Wordnet™.

The extracted snippets (such as 640) may be first processed by the contextual processing engine 130 for context building 680 to obtain context based results. The context building 680 may include at least one of spelling error detection, abbreviation expansion, alias detection, context window detection, critical word detection, and key entity detection. In an example embodiment, the contextual processing engine may include a sequential pipeline of NLP based models to capture the relevant context. The model used in the contextual processing may be at least one a spell check model, an abbreviation model, an alias detection model, a critical word detection model, a key entity detection model, and a learning to rank model. As illustrated in FIG. 6A, the spelling error detection or misspelling detection 608 is performed, wherein any attribute of the extracted snippet (for example—field value) may be corrected for spelling errors. For example, the spelling error for the term "Los Angeles" in field value of snippet 640 is written as "Los Angls" which is corrected by misspelling detection 608. The spelling error detection or misspelling detection 608 may be performed by the spell check model. The spell check model may be a pre-trained model trained for checking an erroneous spelling. The spell check model may be a Bidirectional Long Short Term Memory (BiLSTM) sequence to sequence model including dual encoder and decoder layers. The sequence to sequence model may include a character based language model. The sequence to sequence model may be trained based on a stochastic gradient-based optimization. The stochastic gradient-based optimization is an iterative method used for training models for optimizing an objective function for improved smoothness in properties. The stochastic gradient-based optimization replaces an original gradient of a dataset by an estimated value using random sub-sets of the dataset, so as to reduce computational expense and to achieve faster iterations. In an example embodiment, the stochastic gradient-based optimization may be performed by using an extension, such as, for example, ADAM (derived from Adaptive Moment Estimation) optimization algorithm. The ADAM may be used to update network weights in iterative training. The spell check model may include categorical cross entropy function for quantifying errors. The abbreviation expansion 610 may elaborate one or more abbreviations. For example, the term "Boulevard" is obtained from expansion of abbreviation "Blvd" in the field value for snippet 640. The abbreviation expansion 610 may be performed by the abbreviation model. The abbreviation model may be a pre-trained model that may be trained using a technique such as, for example, Doc2Vec, on domain specific documents. The Doc2Vec is a deep learning technique that provides accurate expansion of an abbreviation by eliminating any disambiguate information in an abbreviation based on context. The abbreviation model may be fed with a training dataset in training phase. The training dataset may include huge volumes of acronym or abbreviation and the corresponding expansion or full-form along with a corresponding relevant context which may be domain-specific. For example, a given abbreviation may have multiple possible expansion and hence domain based relevant context may be useful for accurate prediction by the abbreviation model. In an example embodiment, the training dataset may be retrieved from an external dataset or public repository. In another example embodiment, the training dataset may be obtained from domain specific reference documents by using document embeddings to understand the context in which an acronym is used. The training dataset may be obtained by extracting one or more paragraphs having the acronym and supplying the extracted paragraphs to the abbreviation model. The extracted paragraphs may be embedded in high dimensional vector space, such that based on proximity between vectors, a similarity in context may be derived. Thus, the expansions in the training dataset may be used to collect context, based on which Doc2Vec may provide a score dependent on accuracy pertaining to a correct expansion. Based on the score, the abbreviation model may improve in accuracy of prediction with more training datasets. The alias detection 612 checks for relevance of a term in a snippet with respect to a domain. For example, the term "Dr" may correspond to "drive" in an auto-insurance business but may also correspond to "doctor" in a medical insurance related field, wherein alias detection checks for relevance as per domain. The alias detection 612 may be performed by the alias detection model. The alias detection model may be a pre-trained model trained using word2vec on domain specific documents. The term "word2vec" refers to a natural language processing technique that uses word2vec algorithm. The word2vec associates each distinct word with a specific list of numbers or vectors. The word2vec includes a neural network model to evaluate association between words from a huge corpus of text for training the model. The trained neural network model of word2vec may be able detect or suggest synonymous for a set of words or sentence with respect to a domain specific context. The context window detection 614 may determine a window of relevant terms within a specific phrased limit, even of the terms may not appear together or in a given sequence, as shown in 614.

As shown further in FIG. 6A, the critical word detection 618 may be performed as shown in case of snippet 650. This feature enables to select critical words that may be related by context. For example, terms such as "Fannie Mae" and "Some name" may be detected as critical words. The critical word detection 618 may be performed by the critical word detection model. The critical word detection model may be performed using a transformer architecture based model trained for keyword extraction. In an example embodiment, the transformer may include a Bidirectional Encoder Representations from Transformers (BERT) based keyword extraction. The keyword extraction technique utilizes BERT to extract embeddings to create keywords and key phrases that are similar to a given document. The embeddings are extracted for obtaining a document-level representation. The embeddings are extracted for a sequence of words/phrases. The embeddings are extracted through cosine similarity to find similar natured words/phrases corresponding to critical words. The critical words are detected by retrieving the most relevant or similar natured word that may best describe the whole document with respect to the domain.

The key entity detection 620 may be performed to identify the key attributes such as entity in an extracted snippet. For example, in case of an insurance document, the key entity detection may detect key features such as effective date of insurance, premium amount, policy number and the like. The key entity detection 620 may be performed by the key entity detection model. The key entity detection model may be a pre-trained domain specific model that may include Long Short Term Memory with a Conditional Random Field layer (LSTM-CRF) for entity extraction. Other such key features may also be detected. Based on one or more of the steps described under context building 680, context based results 622 are obtained.

FIG. 7A illustrates an example 700 of extracted snippet and processing performed during context building, according to an example embodiment of the present disclosure. As illustrated in FIG. 7A, the context building may result in different context based results 1, 2 and 3 (710, 720 and 730 respectively) that are obtained after context building. In addition to the above, enrichment of fieldname with synonyms, fuzzy querying, phrase search within permissible gap limits, identifying important words by NLP tool and similar such techniques may also be performed during context building, similar to the steps performed in the training phase as explained in FIG. 4. In an example embodiment, the synonym enrichment may be performed by using word2vec that may include low threshold to have generic match.

As shown in 702 and 704, synonym enrichment and fuzzy querying may be performed to obtain results by considering typo error (erroneous field value 752 including "Los Angls") may lead to result 710. Phrase search within permissible gap limits are shown in 750, wherein between two main keywords such as "99999 Magnet Blvd" and "CA 99999", a gap or few words may be present. FIG. 7B illustrates an example of critical word detection for context building, according to an example embodiment of the present disclosure. As shown in 780 of FIG. 7B, the keywords "Fannie Mae" and "Somename 1" may be detected as critical words in field value of snippet 790. The result shown in 795 may be accepted during conventional extraction/processing, considering close/potential match due to presence of similar name "Somename 2". However, the match is rejected in the present disclosure as the critical word "Somename 1" is not present.

This type of critical word extraction during context building proves to be really useful in filtering irrelevant results that do not such critical words in it.

Figure 8A:
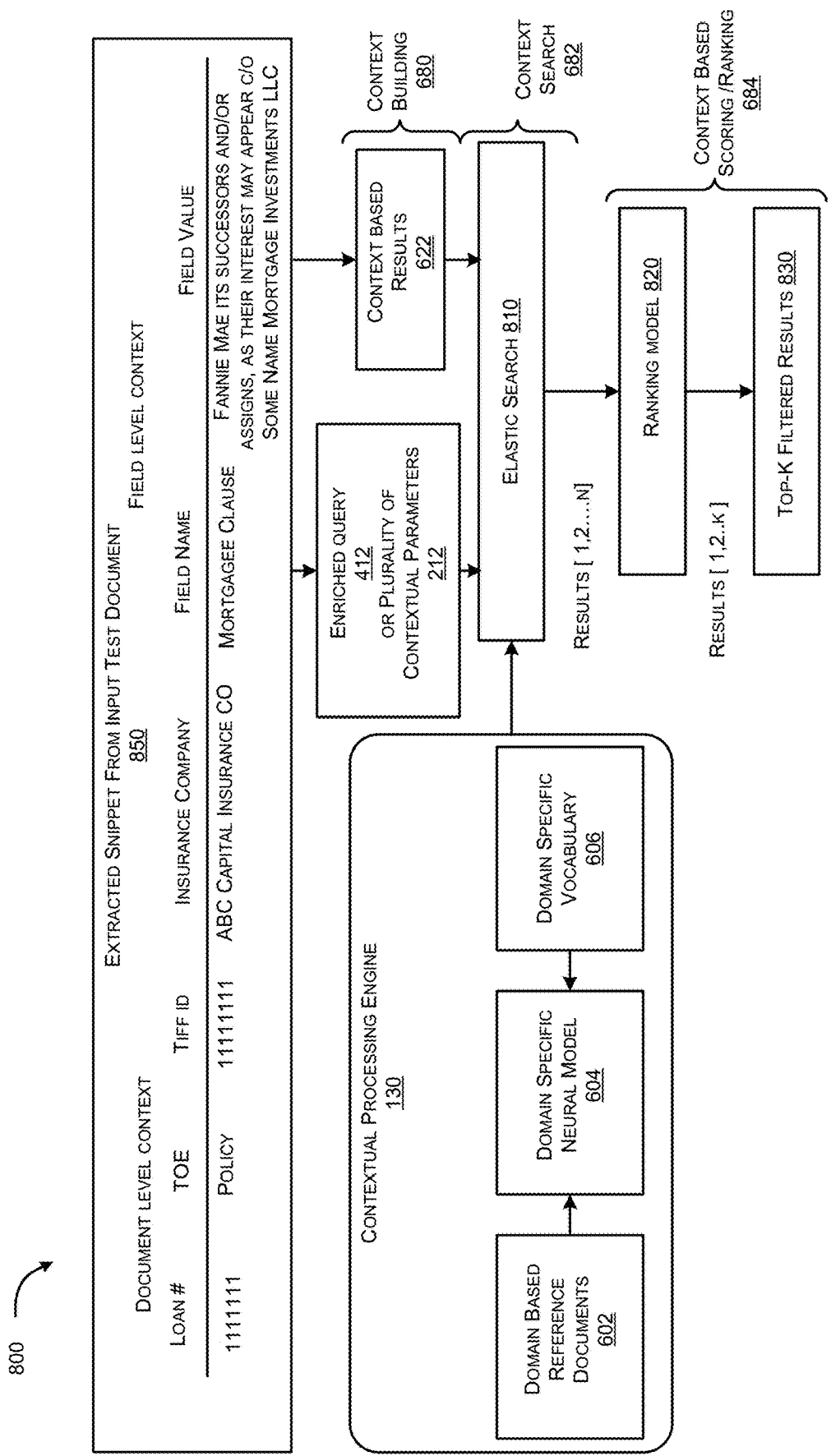
FIG. 8A illustrates a flow diagram for context search and context based ranking involved in contextual processing in continuation to the illustration in FIG. 6B, according to an example embodiment of the present disclosure.

FIG. 8A illustrates a flow diagram 800 for context search and context based ranking involved in contextual processing in continuation to the steps illustrated in FIG. 6B, according to an example embodiment of the present disclosure. As shown in FIG. 6B, after performing context building 680, context search 682 and context based ranking 684 may be performed. Based on the contextual parameters 212 obtained from the training phase and context based results 710 obtained from context building, context search 682 is performed using domain based neural model 604. The model may be used in combination with domain specific vocabulary 606 and reference documents 602. The context search may be performed by indexing text from the input documents. In an example embodiment, the context search may be performed by an elastic search 810 such as Lucene index based elastic search. Using a ranking model 820, the contextual processing engine performs context based ranking 684 allocating a score for each snippet and assigning the corresponding rank to the plurality of filtered snippets based on the allocated score using a ranking model. In an example embodiment, the context based ranking may be performed by combining predictions from multiple models. In an example embodiment, the context based ranking 684 may include assigning a score. This is performed by at least one of term frequency-inverse document frequency (TF-IDF), matched words density, boosted weightage assignment to important words such that based on the score the ranking and/or filtering is performed (for n results) to obtain the top filtered snippets 830 (k results) as output. The output is sent to the user interface.

FIG. 8B illustrates the overview 880 for plurality of filtered snippets (indicated as 830 in FIG. 8A) as received at user interface 170, according to an example embodiment of the present disclosure. As shown in FIG. 8B the filtered snippets may be obtained at the user interface in form of best matches (match 1, 2, 3, ... k), wherein it may be possible to view one of these matches on the user interface 170. In an example embodiment, related to insurance domain, it may be possible to view the snippets in terms of different context such as document level context, policy level context and coverage level context. The user interface 170 may also include a feedback tracking 802. The tracking mode may be used for providing feedback in the feedback phase for further updating the snippets in the learning phase. This is further elaborated in the forthcoming figures. The feedback may indicate at least one of a preference and a data correction of the plurality of filtered snippets.

Figure 9A:
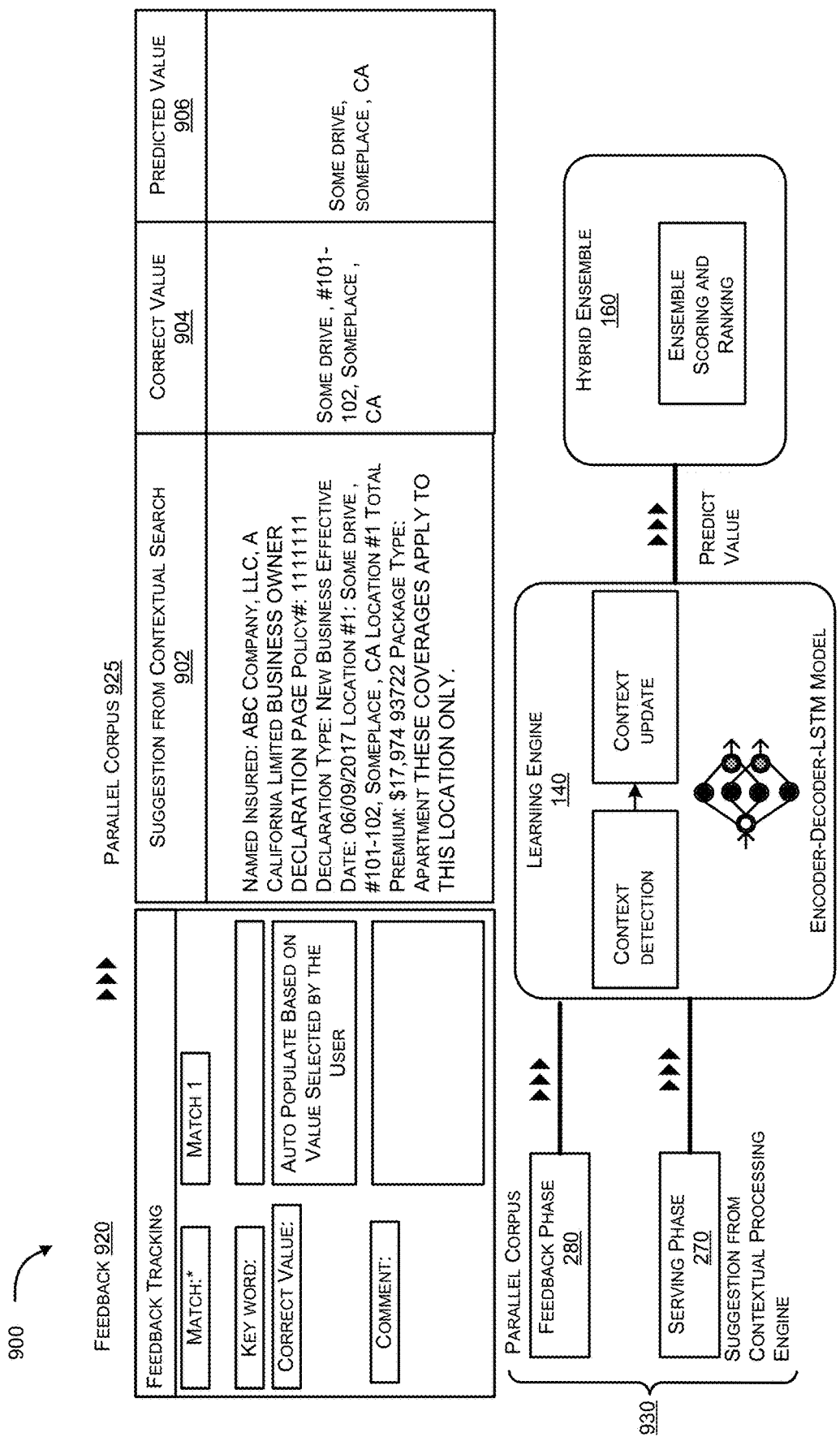
FIG. 9A illustrates an example of processing performed by hybrid ensemble of FIG. 1, according to an example embodiment of the present disclosure.

FIG. 9A illustrates an example 900 of feedback received from user interface and data processing performed by hybrid ensemble 160 of FIG. 1, according to an example embodiment of the present disclosure. As shown in FIG. 9A, the feedback from the feedback tracking (802 shown in FIG. 8B) may enable to check the correctness of the filtered snippets and to further provide a feedback related to the correction in the predicted value. As an example, a parallel corpus may be executed wherein a filtered snippet or a suggestion 902 from contextual processing may be checked for correctness of one or more attributes of the snippet. A predicted value or attribute 906 may be subjected to data correction so as to obtain a correct value 904, wherein the correction may be provided using feedback tracking (shown as 802 in FIG. 8B). The feedback may also include indication of preference of a snippet based on the requirements. The feedback may be provided by a user using the user interface 170. In an example embodiment, the feedback may indicate accuracy/relevance of the filtered snippets generated from contextual processing, as per the user. Based on the information from the feedback phase 280 and the snippets from the contextual processing in the serving phase 270, learning engine 140 may perform a context detection and context update. The context detection is to check the context of the derived filtered snippets from the contextual processing with respect to the feedback from the user interface. For this, feedback is taken into account to update the derived snippets of the output of contextual processing to obtain updated snippets. In an example embodiment, the learning engine 140 may include a neural network based model that may be an encoder decoder based long short term memory (LSTM) model. The model may include categorical cross entropy as loss function for quantifying errors. The updated snippets are then sent to hybrid ensemble 160. The hybrid ensemble 160 may enable modification/update of rank of the received snippets.

Figure 9B:
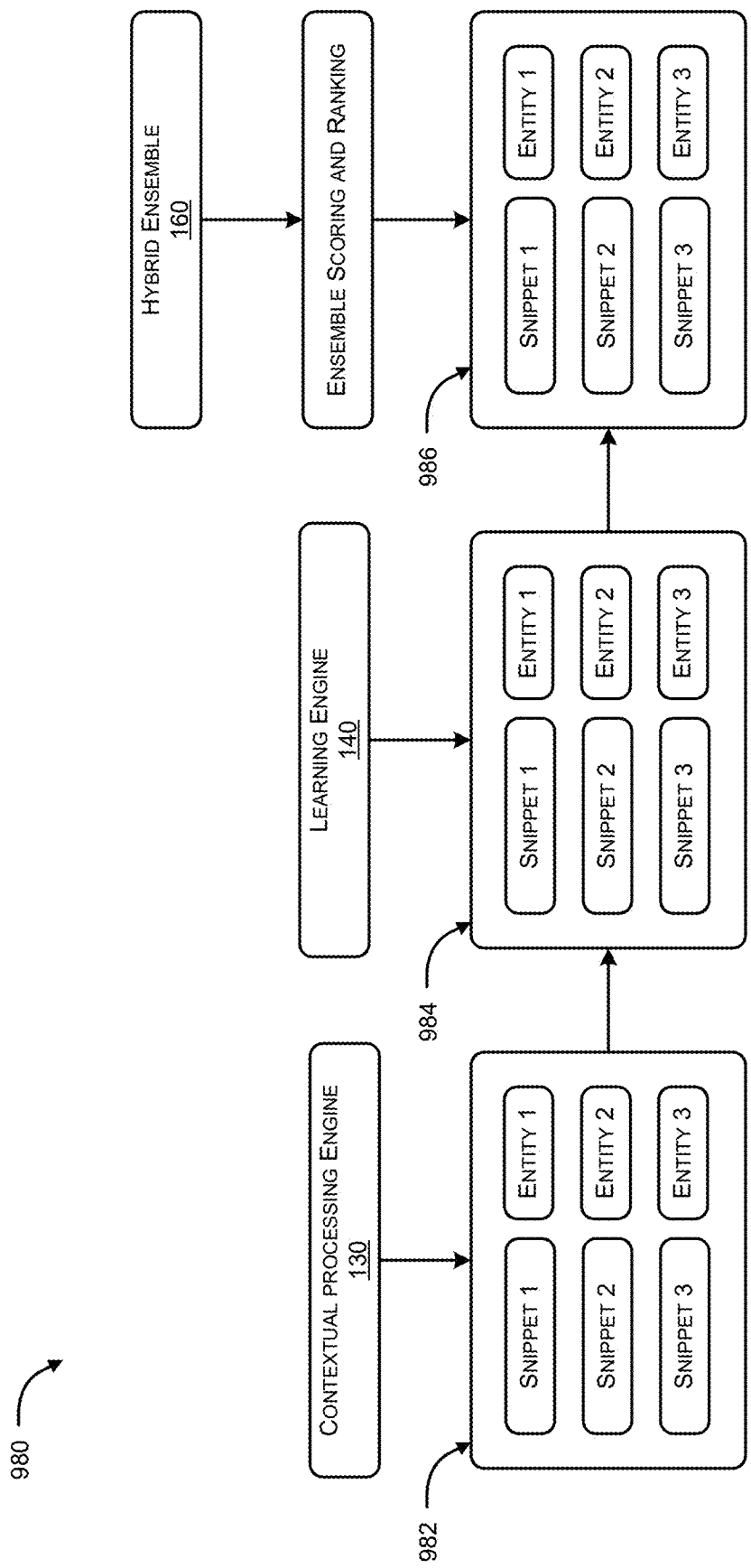
FIG. 9B illustrates an example of data obtained by the processing illustrated in FIG. 9A, according to an example embodiment of the present disclosure.

FIG. 9B illustrates an example 980 of data obtained from hybrid ensemble of FIG. 9A, according to an example embodiment of the present disclosure. The contextual processing engine 130 may provide data 982 including three topmost snippets corresponding to three entities. The learning engine 140 may update the snippets as described in FIG. 8B, to obtain updated snippets 984. Further, the data from the learning engine 140 and the contextual processing engine 130 may be sent to the hybrid ensemble 160, which may receive both the data 982 and 984 and may process to obtain updated rank 986 for the filtered snippets for updating the contextual search engine for future processing. In an example embodiment, the hybrid ensemble may compute a weighted score from the models associated with the contextual processing engine and the learning engine to check if an output from both these models agree. Based on agreement between the output from both the models, specific snippets may be updated with a higher rank.

In an example embodiment, the hybrid ensemble 160 may receive a first data and a second data. The first data may include the plurality of filtered snippets from the contextual processing engine 130. The second data may include the updated plurality of filtered snippets from the learning engine 140. The first data and the second data may be classified in a pre-defined format using one or more models. Further, using the one or more models, a pre-defined weight is assigned to each of the classified first data and the classified second data and a similarity score is determined based on the assigned weights. The rank of each snippet in the plurality of filtered snippets is updated based on the similarity score and an updated rank is obtained. Thus the hybrid ensemble takes into account the feedback and updates the rank of the filtered snippets based on the received information.

As an example embodiment, the information received by the hybrid ensemble from the learning engine and contextual processing engine may be classified using an ensemble classifier. The output of this classification may be in the form of (Snippet, Entity), wherein one snippet may be matched with one entity. The term "snippet" may correspond to a snapshot or collection of words that are extracted in contextual processing. The term "entity" may correspond to name of a person/organization that may be most relevant to the snippet. Each snippet is assigned a score during the context ranking step of contextual processing using a learn function i.e. score in the form of (Snippet, Entity)=$W1*M1+W2*M2$, wherein $W1, W2, \ldots Wn$ are weightage of snippets assigned during contextual ranking step and $M1, M2 \ldots Mn$ correspond to attributes/features of the snippets. A feedback corresponding to these snippets may be provided in the feedback stage. A preference may be indicated for a snippet during feedback phase. The preference is indicated by selecting a result that may be termed as positive, whereas an unselected result may be termed as negative, as shown in Table 1 below. Accordingly a target indicates assignment of value as 0, if entity match with respect to snippet is incorrect and value as 1, if it is correct.

TABLE 1

Example of preference indication during feedback

| (Snippet, Entity) | Model M1 Similarity Score(Actual Entity, Entity from Contextual Search) | Model M2 Similarity Score (Actual Entity, Entity from Feedback learning) | Target | Sample |
| --- | --- | --- | --- | --- |
| (S1, E1) | 0.7 | 0.5 | 1 | Positive [Selected during Feedback] |
| (S2, E2) | 0.3 | 0.2 | 0 | Negative [Not Selected] |
| (S3, E3) | 0.1 | 0.3 | 0 | Negative [Not Selected ] |

Based on the feedback, the model based calculation may be performed in the hybrid ensemble to assign weights $W1=0.1$, $W2=0.4$ and similarity Score of Entity and Predicted Entity are $M1=0.6$, $M2=0.4$. The score/rank may then be calculated using a score prediction=$0.1\times0.6+0.4\times0.4=0.06+0.08=0.14$ Based on the newly generated score (taking feedback into account), the rank for the filtered snippets are updated accordingly. The system learns the updates from all the above mentioned steps and thus the contextual processing in the serving phase improves further.

Figure 10:
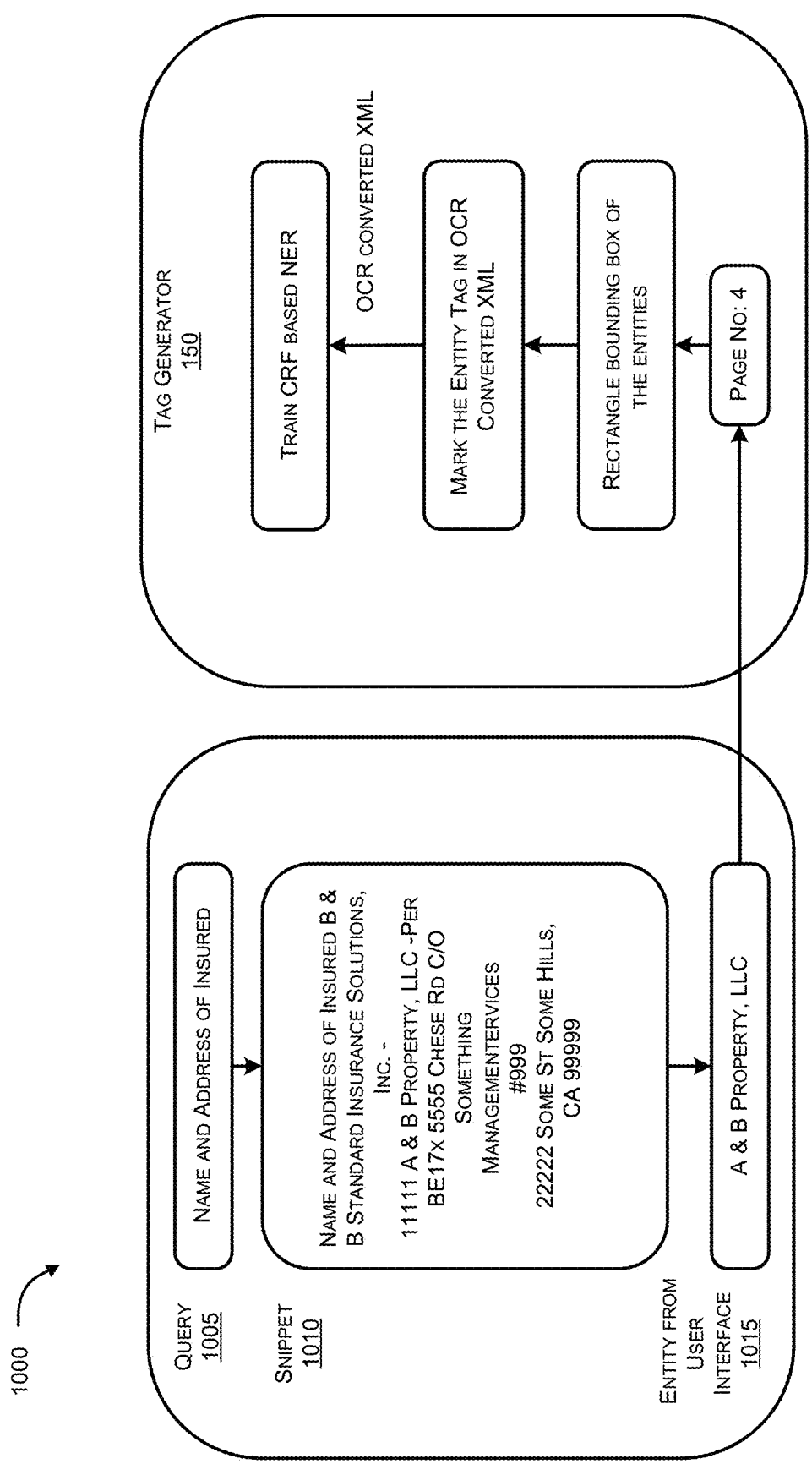
FIG. 10 illustrates an example of the generation of tag annotation by tag generator of FIG. 1, according to an example embodiment of the present disclosure.

FIG. 10 illustrates an example 1000 of the generation of tag annotation by tag generator of FIG. 1, according to an example embodiment of the present disclosure. The tag annotation may be performed to generate an annotation using the plurality of filtered snippets obtained from contextual processing. The annotation corresponds to one or more contextual coordinates corresponding to an image document obtained after scanning of the set of input documents. As illustrated in FIG. 10, the snippet 1010 may include a query 1005 and an entity 1015 as shown. The tag generator automatically tags an attribute such as entity and mentions the co-ordinates of occurrence in the image file or non-readable format of the input documents that is obtained after scanning. As an example, the annotation may be provided by locating page number of occurrence of entity. The annotation may be provided as a rectangle bounding box that may surround the entity name. The marked entity name may be tagged in a readable format by techniques such as, for example, optical character recognition (OCR), to obtain the annotations in readable format such as Extensible Markup Language (XML). This feature may prove to be very useful in case of automated Named Entity Recognition (NER), wherein such annotations are fed to the data trainer to train the system accordingly. In an example embodiment, certain fields may be identified in a snippet during the contextual search. For example, fields such as property address may be identified. The field may be parsed into parts such as, for example, one or more words within the snippet, wherein the entire address may be termed as a named entity. The co-ordinates of the different words of the address may be preserved during snippet identification. The co-ordinates may be passed on to the tag generator. The co-ordinates may be used to re-label the address on each token in a readable XML format. The XML files with the sequential tokens may be used as training samples for Name Entity Recognition (NER). The feedback from contextual search may thus be used to generate training samples to NER based models.

Figure 11:
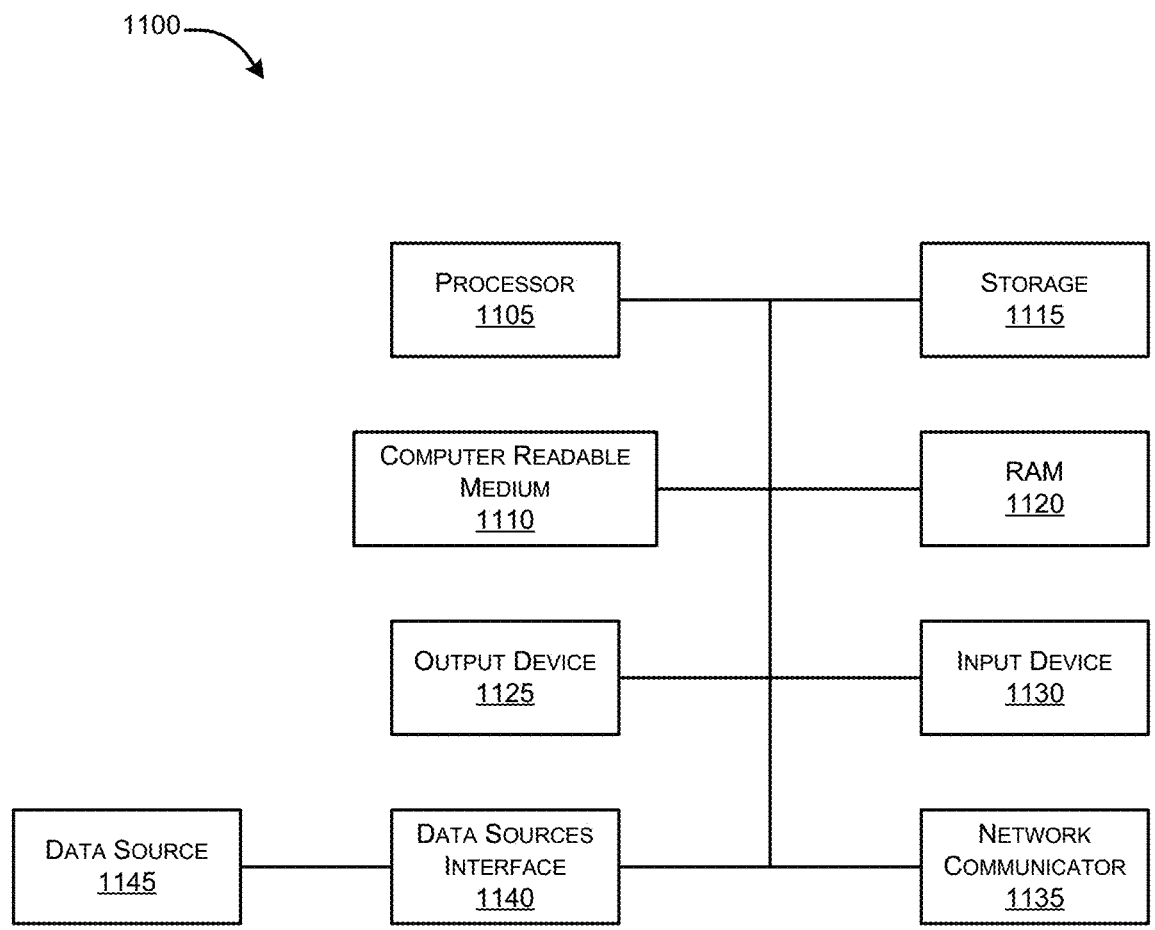
FIG. 11 illustrates a hardware platform for implementation of the disclosed system, according to an example embodiment of the present disclosure.

FIG. 11 illustrates a hardware platform 1100 for the implementation of the system 100 of FIG. 1, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 1100. As illustrated, the hardware platform 1100 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 1100 may be a computer system such as the system 100 that may be used with the embodiments described herein. The computer system may represent a computational platform that includes components that may be in a server or another computer system. The computer system may execute, by the processor 1105 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1105 that executes software instructions or code stored on a non-transitory computer-readable storage medium 1110 to perform methods of the present disclosure. The software code includes, for example, instructions to gather data and documents and analyze documents. In an example, the data trainer 120 and tag generator 150 may be software codes or components performing these steps.

The instructions on the computer-readable storage medium 1110 are read and stored the instructions in storage 1115 or in random access memory (RAM). The storage 1115 may provide a space for keeping static data where at least some instructions could be stored for later execution. The stored instructions may be further compiled to generate other representations of the instructions and dynamically stored in the RAM such as RAM 1120. The processor 1105 may read instructions from the RAM 1120 and perform actions as instructed.

The computer system may further include the output device 1125 to provide at least some of the results of the execution as output including, but not limited to, visual information to users, such as external agents. The output device 1125 may include a display on computing devices and virtual reality glasses. For example, the display may be a mobile phone screen or a laptop screen. GUIs and/or text may be presented as an output on the display screen. The computer system may further include an input device 1130 to provide a user or another device with mechanisms for entering data and/or otherwise interact with the computer system. The input device 1130 may include, for example, a keyboard, a keypad, a mouse, or a touchscreen. Each of these output device 1125 and input device 1130 may be joined by one or more additional peripherals. For example, the output device 1125 may be used to display the results of the contextual processing engine to provide feedback in feedback phase to provide necessary update of output.

A network communicator 1135 may be provided to connect the computer system to a network and in turn to other devices connected to the network including other clients, servers, data stores, and interfaces, for instance. A network communicator 1135 may include, for example, a network adapter such as a LAN adapter or a wireless adapter. The computer system may include a data sources interface 1140 to access the data source 1145. The data source 1145 may be an information resource. As an example, a database of exceptions and rules may be provided as the data source 1145. Moreover, knowledge repositories and curated data may be other examples of the data source 1145.

Figure 12:
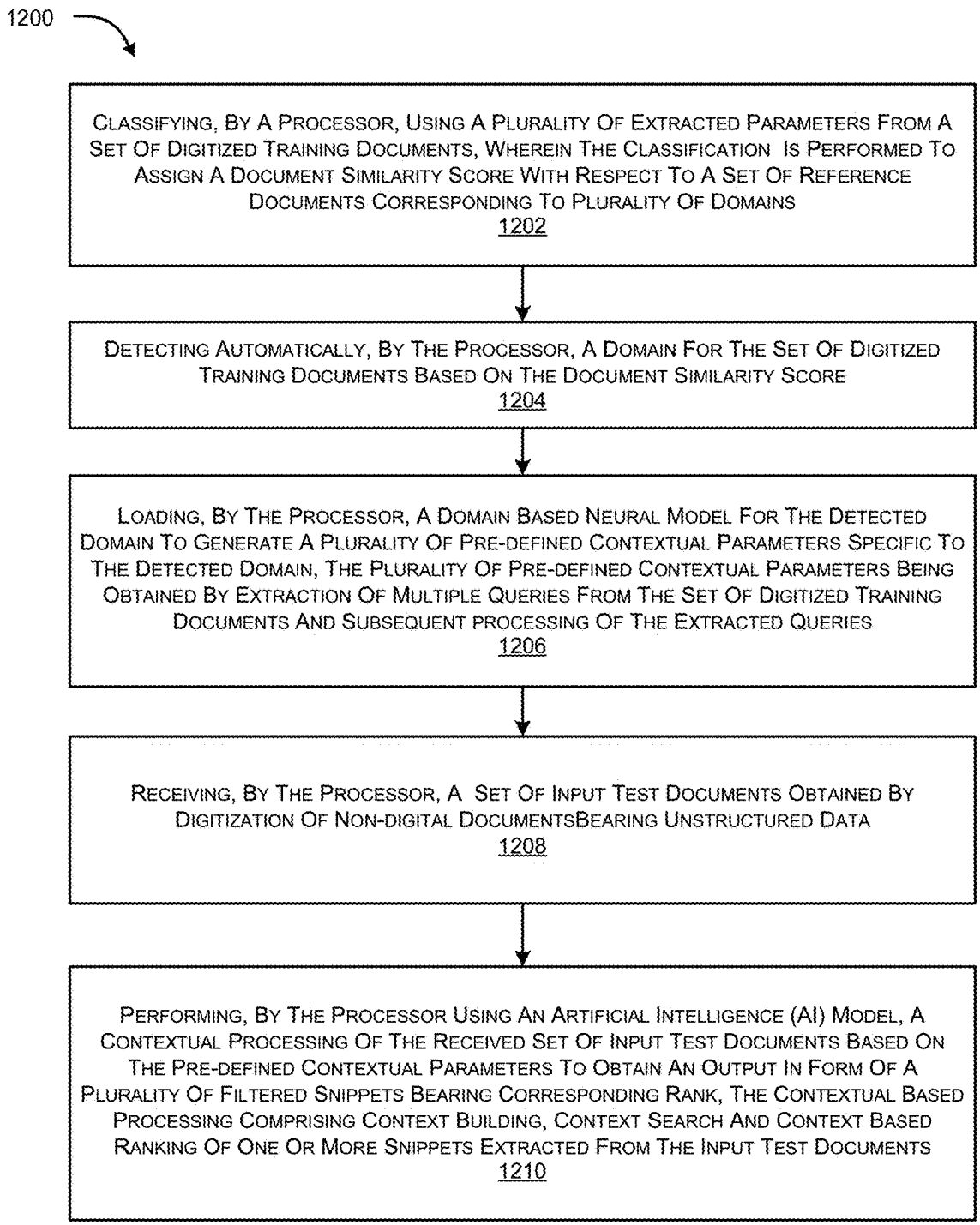
FIG. 12 illustrates a flow diagram for method steps for automated contextual processing for context based verification, according to an example embodiment of the present disclosure.

FIG. 12 illustrates a process flowchart for the system, according to an example embodiment of the present disclosure.

The order in which method 1200 is described is not intended to be construed as a limitation, and any number of the described method blocks may be combined or otherwise performed in any order to implement method 1200, or an alternate method. Additionally, individual blocks may be deleted from method 1200 without departing from the spirit and scope of the present disclosure described herein. Furthermore, method 1200 may be implemented in any suitable hardware, software, firmware, or a combination thereof, that exists in the related art or that is later developed.

The method 1200 describes, without limitation, the implementation of the system 100. A person of skill in the art will understand that method 1200 may be modified appropriately for implementation in various manners without departing from the scope and spirit of the disclosure. The method 1200 may be implemented, in at least some embodiments, by the data trainer 120 of the system 110. For example, data trainer 120 may use the processor(s) to execute computer instructions to obtain contextual parameters in training phase of the system, based on which, processor may perform contextual processing and updating through the contextual processing engine 130 and the learning engine 140 respectively.

The method 1200 may include the step 1202 of classifying, using a classification model, a plurality of extracted parameters from a set of digitized training documents. The classification may be performed to assign a document similarity score with respect to a set of reference documents corresponding to a plurality of domains.

At step 1204, the method may further include the step of detecting automatically a domain for the set of digitized training documents based on the document similarity score.

At step 1206, the method may further include the step of loading a domain based neural model for the detected domain to generate a plurality of pre-defined contextual parameters specific to the detected domain. The plurality of pre-defined contextual parameters may be obtained by extraction of multiple queries from the set of digitized training documents and subsequent processing of the extracted queries.

At step 1208, the method may further include the step of receiving a set of input documents obtained by digitization of the non-digital documents.

At step 1210, the method may further include the step of performing, using an AI model, a contextual processing of the received set of input documents based on the pre-defined contextual parameters to obtain an output in form of a plurality of filtered snippets, each bearing a corresponding rank. The contextual processing may include context building, context search and context based ranking of one or more snippets extracted from the input documents.

The context based verification of the unstructured data may be performed based on the plurality of filtered snippets and the corresponding rank.

The method may further include a step of updating, using a neural network based model, the plurality of filtered snippets by performing a context based detection and context based update based on a feedback from the user interface. The feedback may indicate a preference of at least one of the plurality of filtered snippets.

The method may further include a step of receiving, from a contextual processing engine, a first data comprising the plurality of filtered snippets, receiving, from the learning engine, a second data comprising the updated plurality of filtered snippets. The first data and the second data may be classified in a pre-defined format. A pre-defined weight may be assigned to each of the classified first data and the classified second data. A similarity score may be determined for the plurality of filtered snippets based on the assigned weights and the rank of each snippet in the plurality of filtered snippets may be determined to assign an updated rank.

The method may further include a step of automatically generating an annotation using the plurality of filtered snippets obtained from contextual processing. The annotation corresponds to one or more contextual coordinates corresponding to an image document obtained after scanning of the set of input documents. The annotation may be fed to the data trainer for enabling automated named entity recognition (NER).

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system for automated contextual processing, the system comprising:
   a processor;

a data trainer coupled to the processor, the data trainer to:
classify, using a classification model, a plurality of extracted parameters from a set of digitized training documents, wherein the classification is performed to assign a document similarity score with respect to a set of reference documents corresponding to a plurality of domains;
detect automatically, a domain for the set of digitized training documents based on the document similarity score; and
load a domain based neural model for the detected domain to generate a plurality of pre-defined contextual parameters specific to the detected domain, the plurality of pre-defined contextual parameters being obtained by extraction of multiple queries from the set of digitized training documents and subsequent processing of the extracted queries;
a contextual processing engine of the processor, the engine to:
receive a set of input documents obtained by digitization of a non-digital documents;
perform, through an AI model, a contextual processing of the received set of input documents based on the pre-defined contextual parameters to obtain an output in form of a plurality of filtered snippets each bearing a corresponding rank, the contextual processing comprising context building, context search and context-based ranking of one or more snippets extracted from the input documents; and
wherein a context-based verification of the unstructured data is performed based on the plurality of filtered snippets and the corresponding rank; and
a hybrid ensemble coupled to the processor, wherein the hybrid ensemble is configured to:
receive, from the contextual processing engine, a first data comprising the plurality of filtered snippets;
receive, from a learning engine coupled to the processor, a second data comprising an updated plurality of filtered snippets;
classify, using one or more models, the first data and the second data in a pre-defined format;
assign, using the one or more models, a pre-defined weight to each of the classified first data and the classified second data;
determine, using the one or more models, a similarity score based on the assigned weights; and
update, using the one or more models, the rank of each snippet in the plurality of filtered snippets to assign an updated rank.

2. The system as claimed in claim 1, wherein the system comprises the learning engine of the processor to generate the updated plurality of filtered snippets by:
updating, using a neural network based model, the plurality of filtered snippets by performing a context-based detection and context-based update, based on a feedback from a user interface, the feedback indicating preference of at least one of the plurality of filtered snippets, and wherein the neural network based model is an encoder decoder based long short term memory (LSTM) model.

3. The system as claimed in claim 1, wherein the classification comprises a few-shot text classification, wherein the classification model comprises at least one of an attention-based induction network model, and a Siamese based network model, and wherein the document similarity score is generated by a natural language processing tool.

4. The system as claimed in claim 1, wherein the document similarity score is generated by comparing the extracted plurality of parameters with corresponding parameters in the set of reference documents.

5. The system as claimed in claim 1, wherein the plurality of pre-defined contextual parameters are generated by the domain based neural model in combination with a first predefined vocabulary specific to the detected domain, wherein the processing of the extracted queries comprises enrichment of the extracted queries by at least one of synonym enrichment, domain based filtering, and query cleaning.

6. The system as claimed in claim 5, wherein the synonym enrichment comprises generating one or more synonyms for the extracted queries, wherein the domain-based filtering comprises filtering the extracted queries based on relevance with respect to the detected domain, and the query cleaning comprises obtaining the extracted queries in a predefined format.

7. The system as claimed in claim 1, wherein the plurality of filtered snippets are generated by the AI model in combination with a second predefined vocabulary specific to the detected domain.

8. The system as claimed in claim 1, wherein the context building in the contextual processing is performed based on at least one of spelling error detection, abbreviation expansion, alias detection, context window detection, critical word detection, key entity detection, enrichment of fieldname with synonyms, fuzzy querying and phrase search within permissible gap limits to obtain context based results.

9. The system as claimed in claim 8, wherein the critical word detection is to detect relevance of a word in presence of one or more synonyms.

10. The system as claimed in claim 8, wherein based on the combination of the plurality of pre-defined contextual parameters from the data trainer and the context-based results obtained from the context building, the context-based search is performed by an elastic search so as to obtain the plurality of filtered snippets.

11. The system as claimed in claim 1, wherein the context-based ranking includes allocating a score for each snippet and assigning the corresponding rank to the plurality of filtered snippets based on the allocated score using a ranking model.

12. The system as claimed in claim 1, wherein the system comprises an automated tag generator coupled to the processor, the tag generator to:
generate an annotation using the plurality of filtered snippets obtained from contextual processing, wherein the annotation corresponds to one or more contextual coordinates corresponding to an image document obtained after scanning of the set of input documents,
wherein the annotation is fed to the data trainer for automated named entity recognition (NER).

13. The system as claimed in claim 1, wherein the plurality of pre-defined contextual parameters and plurality of filtered snippets comprise at least one of entity name, entity identification data, and serial number of service provided by the entity, date of service initiation, service duration, address of entity and operational information.

14. A method for automated contextual processing, the method comprising:
classifying, by a processor, using a classification model, a plurality of extracted parameters from a set of digitized training documents, wherein the classification is performed to assign a document similarity score with respect to a set of reference documents corresponding to a plurality of domains;

detecting automatically, by the processor, a domain for the set of digitized training documents based on the document similarity score;

loading, by the processor, a domain based neural model for the detected domain to generate a plurality of pre-defined contextual parameters specific to the detected domain, the plurality of pre-defined contextual parameters being obtained by extraction of multiple queries from the set of digitized training documents and subsequent processing of the extracted queries;

receiving, by the processor, a set of input documents obtained by digitization of a non-digital documents;

performing, by the processor, using an AI model, a contextual processing of the received set of input documents based on the pre-defined contextual parameters to obtain an output in form of a plurality of filtered snippets, each bearing a corresponding rank, the contextual processing comprising context building, context search and context-based ranking of one or more snippets extracted from the input documents;

wherein a context-based verification of the unstructured data is performed based on the plurality of filtered snippets and the corresponding rank;

receiving, by the processor, from a contextual processing engine, a first data comprising the plurality of filtered snippets;

receiving, by the processor, from a learning engine coupled to the processor, a second data comprising an updated plurality of filtered snippets;

classifying, by the processor, using one or more models, the first data and the second data in a pre-defined format;

assigning, by the processor, using the one or more models, a pre-defined weight to each of the classified first data and the classified second data;

determining, by the processor, using the one or more models, a similarity score for the plurality of filtered snippets based on the assigned weights; and updating, by the processor, using the one or more models, the rank of each snippet in the plurality of filtered snippets to assign an updated rank.

15. The method as claimed in claim 14, wherein the updated plurality of filtered snippets are generated by:

updating, by the processor, using a neural network based model, the plurality of filtered snippets by performing a context-based detection and context-based update based on a feedback from the user interface, the feedback indicating preference of at least one of the plurality of filtered snippets, and wherein the neural network based model is an encoder decoder based long short term memory (LSTM) model.

16. The method as claimed in claim 14 comprising:

generating automatically, by the processor, an annotation using the plurality of filtered snippets obtained from contextual processing, wherein the annotation corresponds to one or more contextual coordinates corresponding to an image document obtained after scanning of the set of input documents, wherein the annotation is fed to the data trainer for enabling automated named entity recognition (NER).

17. A non-transitory computer readable medium comprising machine executable instructions that are executable by a processor to:

classify a plurality of extracted parameters from a set of digitized training documents, wherein the classification is performed so as to assign a document similarity score with respect to a set of reference documents corresponding to a plurality of domains;

detect automatically, a domain for the set of digitized training documents based on the document similarity score;

load a domain based neural model for the detected domain to generate a plurality of pre-defined contextual parameters specific to the detected domain, the plurality of pre-defined contextual parameters being obtained by extraction of multiple queries from the set of digitized training documents and subsequent processing of the extracted queries;

receive a set of input documents that are obtained by digitization of a non-digital input documents through optical character recognition (OCR); and perform a contextual processing of the received set of input documents based on the pre-defined contextual parameters to obtain an output in form of a plurality of filtered snippets each bearing a corresponding rank, the contextual processing comprising context building, context search and context-based ranking of one or more snippets extracted from the input documents;

wherein a context-based verification of the unstructured data is performed based on the plurality of filtered snippets and the corresponding rank;

receive a first data comprising the plurality of filtered snippets;

receive a second data comprising an updated plurality of filtered snippets;

classify using one or more models, the first data and the second data in a pre-defined format;

assign using the one or more models, a pre-defined weight to each of the classified first data and the classified second data;

determine using the one or more models, a similarity score for the plurality of filtered snippets based on the assigned weights; and update using the one or more models, the rank of each snippet in the plurality of filtered snippets to assign an updated rank.

18. The non-transitory computer readable medium as claimed in claim 17, wherein to generate the updated plurality of filtered snippets, the machine executable instructions are executable by a processor to:

update the plurality of filtered snippets by performing a context-based detection and context-based update, based on a feedback from a user interface, the feedback indicating preference of at least one of the plurality of filtered snippets, and wherein the neural network-based model is an encoder decoder based long short-term memory (LSTM) model.

* * * * *